US010697994B2

(12) United States Patent
Acar et al.

(10) Patent No.: US 10,697,994 B2
(45) Date of Patent: Jun. 30, 2020

(54) ACCELEROMETER TECHNIQUES TO COMPENSATE PACKAGE STRESS

(71) Applicant: SEMICONDUCTOR COMPONENTS INDUSTRIES, LLC, Phoenix, AZ (US)

(72) Inventors: Cenk Acar, Newport Coast, CA (US); Brenton Ross Simon, Fremont, CA (US); Sandipan Maity, San Carlos, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 475 days.

(21) Appl. No.: 15/439,516

(22) Filed: Feb. 22, 2017

(65) Prior Publication Data
US 2018/0238925 A1 Aug. 23, 2018

(51) Int. Cl.
*G01P 15/125* (2006.01)
*G01P 15/18* (2013.01)
*G01P 15/08* (2006.01)

(52) U.S. Cl.
CPC ............ *G01P 15/125* (2013.01); *G01P 15/18* (2013.01); *G01P 2015/0831* (2013.01)

(58) Field of Classification Search
CPC ..... G01P 2015/0825; G01P 2015/0828; G01P 2015/0831; G01P 2015/0834; G01P 2015/0837
See application file for complete search history.

(56) References Cited

U.S. PATENT DOCUMENTS

| 5,487,305 A | 1/1996 | Ristic et al. |
| 5,656,778 A | 8/1997 | Roszhart |
| 5,723,790 A | 3/1998 | Andersson |
| 5,894,091 A | 4/1999 | Kubota |
| 6,131,457 A | 10/2000 | Sato |
| 6,250,157 B1 | 6/2001 | Touge |
| 6,501,282 B1 | 12/2002 | Dummermuth et al. |
| 6,504,385 B2 | 1/2003 | Hartwell |
| 6,725,719 B2 | 4/2004 | Cardarelli |

(Continued)

FOREIGN PATENT DOCUMENTS

| CN | 1389704 A | 1/2003 |
| CN | 1813192 A | 8/2006 |

(Continued)

OTHER PUBLICATIONS

"U.S. Appl. No. 12/849,742, Non Final Office Action dated Mar. 28, 2013", 9 pgs.

(Continued)

*Primary Examiner* — Herbert K Roberts
(74) *Attorney, Agent, or Firm* — Brake Hughes Bellermann LLP

(57) ABSTRACT

Techniques for compensating package stress of a proof mass are provided. In an example, a proof mass can be suspended from a substrate by a proof mass anchor. The first proof mass can have a major surface that defines a first plane. Portions of electrodes forming part of the proof mass can be symmetric with each other across a first line, wherein the first line bisects the first proof mass anchor, extends parallel to the first plane and extends between the first electrode and the second electrode.

14 Claims, 6 Drawing Sheets

(56) References Cited

U.S. PATENT DOCUMENTS

| | | |
|---|---|---|
| 6,848,304 B2 | 2/2005 | Geen |
| 7,051,590 B1 | 5/2006 | Lemkin et al. |
| 7,093,487 B2 | 8/2006 | Mochida |
| 7,210,351 B2 | 5/2007 | Lo et al. |
| 7,240,552 B2 | 7/2007 | Acar et al. |
| 7,258,011 B2 | 8/2007 | Nasiri et al. |
| 7,258,012 B2 | 8/2007 | Xie et al. |
| 7,293,460 B2 | 11/2007 | Zarabadi et al. |
| 7,518,493 B2 | 4/2009 | Bryzek et al. |
| 7,539,003 B2 | 5/2009 | Curtis |
| 7,600,428 B2 | 10/2009 | Robert et al. |
| 7,694,563 B2 | 4/2010 | Durante et al. |
| 7,817,331 B2 | 10/2010 | Moidu |
| 7,950,281 B2 | 5/2011 | Hammerschmidt |
| 8,006,557 B2 | 8/2011 | Yin et al. |
| 8,113,050 B2 | 2/2012 | Acar et al. |
| 8,171,792 B2 | 5/2012 | Sameshima |
| 8,201,449 B2 | 6/2012 | Ohuchi et al. |
| 8,250,921 B2 | 8/2012 | Nasiri et al. |
| 8,256,290 B2 | 9/2012 | Mao |
| 8,739,626 B2 | 6/2014 | Acar |
| 8,813,564 B2 | 8/2014 | Acar |
| 8,978,475 B2 | 3/2015 | Acar |
| 9,003,882 B1 | 4/2015 | Ayazi et al. |
| 9,062,972 B2 | 6/2015 | Acar et al. |
| 9,246,018 B2 | 1/2016 | Acar |
| 9,278,845 B2 | 3/2016 | Acar |
| 9,278,846 B2 | 3/2016 | Acar |
| 9,352,961 B2 | 5/2016 | Acar et al. |
| 9,455,354 B2 | 9/2016 | Acar |
| 9,599,472 B2 | 3/2017 | Acar et al. |
| 2002/0021059 A1 | 2/2002 | Knowles et al. |
| 2002/0189352 A1 | 12/2002 | John, III et al. |
| 2003/0061878 A1 | 4/2003 | Pinson |
| 2003/0200807 A1 | 10/2003 | Hulsing, II |
| 2004/0177689 A1 | 9/2004 | Cho et al. |
| 2004/0211258 A1 | 10/2004 | Geen |
| 2004/0219340 A1 | 11/2004 | McNeil et al. |
| 2004/0231420 A1 | 11/2004 | Xie et al. |
| 2005/0005698 A1 | 1/2005 | McNeil et al. |
| 2005/0097957 A1 | 5/2005 | Mcneil et al. |
| 2005/0139005 A1 | 6/2005 | Geen |
| 2006/0032308 A1 | 2/2006 | Acar et al. |
| 2006/0112764 A1 | 6/2006 | Higuchi |
| 2006/0207328 A1 | 9/2006 | Zarabadi et al. |
| 2006/0213265 A1 | 9/2006 | Weber et al. |
| 2006/0213266 A1 | 9/2006 | French et al. |
| 2006/0213268 A1 | 9/2006 | Asami et al. |
| 2006/0283245 A1 | 12/2006 | Konno et al. |
| 2007/0034005 A1 | 2/2007 | Acar et al. |
| 2007/0113653 A1 | 5/2007 | Nasiri et al. |
| 2007/0214883 A1 | 9/2007 | Durante et al. |
| 2007/0220973 A1 | 9/2007 | Acar |
| 2007/0238212 A1* | 10/2007 | Merassi .............. G01P 15/125 438/48 |
| 2008/0092652 A1 | 4/2008 | Acar |
| 2008/0202237 A1 | 8/2008 | Hammerschmidt |
| 2008/0245148 A1 | 10/2008 | Fukumoto |
| 2008/0314147 A1 | 12/2008 | Nasiri |
| 2009/0007661 A1 | 1/2009 | Nasiri et al. |
| 2009/0064780 A1 | 3/2009 | Coronato et al. |
| 2009/0114016 A1 | 5/2009 | Nasiri et al. |
| 2009/0183570 A1* | 7/2009 | Acar .................... G01P 15/125 73/514.32 |
| 2009/0266163 A1 | 10/2009 | Ohuchi et al. |
| 2010/0024548 A1 | 2/2010 | Cardarelli |
| 2010/0058864 A1 | 3/2010 | Hsu et al. |
| 2010/0089154 A1 | 4/2010 | Ballas et al. |
| 2010/0122579 A1 | 5/2010 | Hsu et al. |
| 2010/0126269 A1 | 5/2010 | Coronato et al. |
| 2010/0212425 A1 | 8/2010 | Hsu et al. |
| 2010/0236327 A1 | 9/2010 | Mao et al. |
| 2011/0030473 A1 | 2/2011 | Acar |
| 2011/0030474 A1 | 2/2011 | Kuang et al. |
| 2011/0094302 A1 | 4/2011 | Schofield et al. |
| 2011/0265564 A1 | 11/2011 | Acar et al. |
| 2013/0139591 A1 | 6/2013 | Acar |
| 2013/0139592 A1 | 6/2013 | Acar |
| 2013/0192364 A1 | 8/2013 | Acar |
| 2013/0192369 A1 | 8/2013 | Acar et al. |
| 2013/0247666 A1 | 9/2013 | Acar |
| 2013/0270657 A1 | 10/2013 | Acar et al. |
| 2013/0298671 A1 | 11/2013 | Acar et al. |
| 2013/0328139 A1 | 12/2013 | Acar |
| 2015/0059473 A1 | 3/2015 | Jia |
| 2015/0114112 A1 | 4/2015 | Valzasina et al. |
| 2015/0185012 A1 | 7/2015 | Acar |
| 2016/0264404 A1 | 9/2016 | Acar |
| 2016/0334438 A1* | 11/2016 | Thompson ............ G01P 15/125 |

FOREIGN PATENT DOCUMENTS

| | | |
|---|---|---|
| CN | 1816747 A | 8/2006 |
| CN | 1818552 A | 8/2006 |
| CN | 1948906 A | 4/2007 |
| CN | 101038299 A | 9/2007 |
| CN | 101069099 A | 11/2007 |
| CN | 101180516 A | 5/2008 |
| CN | 101270988 A | 9/2008 |
| CN | 101561275 A | 10/2009 |
| CN | 101055180 A | 10/2010 |
| CN | 101858928 A | 10/2010 |
| CN | 102597699 A | 7/2012 |
| CN | 103221778 A | 7/2013 |
| CN | 103221779 A | 7/2013 |
| CN | 103238075 A | 8/2013 |
| CN | 103403495 A | 11/2013 |
| CN | 104094084 A | 10/2014 |
| CN | 104105945 A | 10/2014 |
| CN | 104272062 A | 1/2015 |
| DE | 112011103124 T5 | 12/2013 |
| EP | 1688705 A2 | 8/2006 |
| EP | 1832841 A1 | 9/2007 |
| EP | 1860402 A1 | 11/2007 |
| EP | 2053413 A1 | 4/2009 |
| JP | 09089927 A | 4/1997 |
| JP | 10239347 A | 9/1998 |
| JP | 1164002 A | 3/1999 |
| JP | 2000046560 A | 2/2000 |
| JP | 3882972 B2 | 2/2007 |
| JP | 2007024864 A | 2/2007 |
| JP | 2008294455 A | 12/2008 |
| JP | 2010025898 A | 2/2010 |
| JP | 2010506182 A | 2/2010 |
| KR | 1020130052653 A | 5/2013 |
| KR | 1020130061181 A | 6/2013 |
| KR | 1020130097209 A | 9/2013 |
| KR | 1020130142116 A | 12/2013 |
| KR | 101352827 B1 | 1/2014 |
| TW | I255341 B | 5/2006 |
| WO | WO-0175455 A2 | 10/2001 |
| WO | WO-2008059757 A1 | 5/2008 |
| WO | WO-2009050578 A2 | 4/2009 |
| WO | WO-2009156485 A1 | 12/2009 |
| WO | WO-2011016859 A2 | 2/2011 |
| WO | WO-2011016859 A3 | 2/2011 |
| WO | WO-2012037501 A2 | 3/2012 |
| WO | WO-2012037501 A3 | 3/2012 |
| WO | WO-2012037538 A2 | 3/2012 |
| WO | WO-2012037539 A1 | 3/2012 |
| WO | WO-2012037539 A9 | 3/2012 |
| WO | WO-2012037540 A2 | 3/2012 |
| WO | WO-2013115967 A1 | 8/2013 |
| WO | WO-2013116356 A1 | 8/2013 |
| WO | WO-2013116514 A1 | 8/2013 |
| WO | WO-2013116522 A1 | 8/2013 |

OTHER PUBLICATIONS

"U.S. Appl. No. 12/849,742, Non Final Office Action dated Aug. 23, 2012", 9 pgs.

"U.S. Appl. No. 12/849,742, Notice of Allowance dated Nov. 29, 2013", 7 pgs.

(56) References Cited

OTHER PUBLICATIONS

"U.S. Appl. No. 12/849,742, Response filed Jan. 23, 2013 to Non Final Office Action dated Aug. 23, 2012", 10 pgs.
"U.S. Appl. No. 12/849,742, Response filed Sep. 30, 2013 to Non-Final Office Action dated Mar. 28, 2013", 12 pgs.
"U.S. Appl. No. 12/849,742, Supplemental Notice of Allowability dated Mar. 17, 2014", 3 pgs.
"U.S. Appl. No. 12/849,742, Supplemental Notice of Allowability dated May 5, 2014", 2 pgs.
"U.S. Appl. No. 13/362,955, Final Office Action dated Nov. 19, 2014", 5 pgs.
"U.S. Appl. No. 13/362,955, Non Final Office Action dated Apr. 15, 2014", 9 pgs.
"U.S. Appl. No. 13/362,955, Notice of Allowance dated Feb. 25, 2015", 8 pgs.
"U.S. Appl. No. 13/362,955, Response filed Jan. 16, 2015 to Final Office Action dated Nov. 19, 2014", 9 pgs.
"U.S. Appl. No. 13/362,955, Response filed Feb. 17, 2014 to Restriction Requirement dated Dec. 17, 2013", 9 pgs.
"U.S. Appl. No. 13/362,955, Response filed Aug. 15, 2014 to Non Final Office Action dated May 15, 2014", 13 pgs.
"U.S. Appl. No. 13/362,955, Restriction Requirement dated Dec. 17, 2013", 6 pgs.
"U.S. Appl. No. 13/363,537, Corrected Notice of Allowance dated Jan. 28, 2015", 2 pgs.
"U.S. Appl. No. 13/363,537, Examiner Interview Summary dated Sep. 29, 2014", 3 pgs.
"U.S. Appl. No. 13/363,537, Final Office Action dated Jun. 27, 2014", 8 pgs.
"U.S. Appl. No. 13/363,537, Non Final Office Action dated Feb. 6, 2014", 10 pgs.
"U.S. Appl. No. 13/363,537, Notice of Allowance dated Nov. 7, 2014", 5 pgs.
"U.S. Appl. No. 13/363,537, Response filed Jun. 6, 2014 to Non Final Office Action dated Feb. 6, 2014", 11 pgs.
"U.S. Appl. No. 13/363,537, Response filed Sep. 29, 2014 to Final Office Action dated Jun. 27, 2014", 9 pgs.
"U.S. Appl. No. 13/755,841, Notice of Allowance dated May 7, 2014", 8 pgs.
"U.S. Appl. No. 13/755,841, Preliminary Amendment filed Oct. 10, 2013", 10 pgs.
"U.S. Appl. No. 13/755,841, Response filed Apr. 21, 2014 to Restriction Requirement dated Feb. 21, 2014", 7 pgs.
"U.S. Appl. No. 13/755,841, Restriction Requirement dated Feb. 21, 2014", 6 pgs.
"U.S. Appl. No. 13/755,841, Supplemental Notice of Allowability dated Jun. 27, 2014", 2 pgs.
"U.S. Appl. No. 13/755,953, Non Final Office Action dated May 14, 2015", 11 pgs.
"U.S. Appl. No. 13/755,953, Notice of Allowance dated Oct. 28, 2015", 5 pgs.
"U.S. Appl. No. 13/755,953, Response filed May 4, 2015 to Restrictiion Requirement dated Mar. 3, 2015", 7 pgs.
"U.S. Appl. No. 13/755,953, Response filed Sep. 15, 2015 to Non Final Office Action dated May 14, 2015", 10 pgs.
"U.S. Appl. No. 13/755,953, Restriction Requirement dated Mar. 3, 2015", 6 pgs.
"U.S. Appl. No. 13/813,443, Non Final Office Action dated Jun. 10, 2015", 10 pgs.
"U.S. Appl. No. 13/813,443, Notice of Allowance dated Feb. 4, 2016", 7 pgs.
"U.S. Appl. No. 13/813,443, Preliminary Amendment dated Jan. 31, 2013", 3 pgs.
"U.S. Appl. No. 13/813,443, Response filed May 22, 2015 to Restriction Requirement dated Apr. 29, 2015", 7 pgs.
"U.S. Appl. No. 13/813,443, Response filed Oct. 13, 2015 to Non Final Office Action dated Jun. 10, 2015", 7 pgs.
"U.S. Appl. No. 13/813,443, Restriction Requirement dated Apr. 29, 2015", 6 pgs.
"U.S. Appl. No. 13/821,793, Non Final Office Action dated Jul. 27, 2015", 14 pgs.
"U.S. Appl. No. 13/821,793, Notice of Allowance dated Nov. 24, 2015", 5 pgs.
"U.S. Appl. No. 13/821,793, Preliminary Amendment dated Mar. 8, 2013", 3 pgs.
"U.S. Appl. No. 13/821,793, Response filed Oct. 27, 2015 to Non Final Office Action dated Jul. 27, 2015", 12 pgs.
"U.S. Appl. No. 13/821,842, Corrected Notice of Allowance dated Oct. 19, 2015", 2 pgs.
"U.S. Appl. No. 13/821,842, Examiner Interview Summary dated Sep. 15, 2015", 3 pgs.
"U.S. Appl. No. 13/821,842, Non Final Office Action dated Mar. 18, 2015", 20 pgs.
"U.S. Appl. No. 13/821,842, Notice of Allowance Received dated Sep. 15, 2015", 13 pgs.
"U.S. Appl. No. 13/821,842, Preliminary Amendment dated Mar. 8, 2013", 3 pgs.
"U.S. Appl. No. 13/821,842, Response filed Jun. 18, 2015 Non Final Office Action dated Mar. 18, 2015", 11 pgs.
"U.S. Appl. No. 13/821,842, Supplemental Notice of Allowability dated Sep. 28, 2015", 2 pgs.
"U.S. Appl. No. 13/821,853, Final Office Action dated Jan. 25, 2016", 6 pgs.
"U.S. Appl. No. 13/821,853, Final Office Action dated Jun. 18, 2015", 7 pgs.
"U.S. Appl. No. 13/821,853, Non Final Office Action dated Feb. 18, 2015", 15 pgs.
"U.S. Appl. No. 13/821,853, Non Final Office Action dated Jul. 30, 2014", 10 pgs.
"U.S. Appl. No. 13/821,853, Notice of Allowance dated May 20, 2016", 8 pgs.
"U.S. Appl. No. 13/821,853, Preliminary Amendment dated Mar. 8, 2013", 3 pgs.
"U.S. Appl. No. 13/821,853, Response filed Apr. 25, 2016 to Final Office Action dated Jan. 25, 2016", 7 pgs.
"U.S. Appl. No. 13/821,853, Response filed May 18, 2015 to Non Final Office Action dated Feb. 18, 2015", 12 pgs.
"U.S. Appl. No. 13/821,853, Response filed Oct. 19, 2015 to Final Office Action dated Jun. 18, 2015", 8 pgs.
"U.S. Appl. No. 13/821,853, Response filed Dec. 1, 2014 to Non Final Office Action dated Jul. 30, 2014", 10 pgs.
"U.S. Appl. No. 14/658,579, Advisory Action dated Oct. 26, 2016", 3 pgs.
"U.S. Appl. No. 14/658,579, Final Office Action dated Jul. 14, 2016", 6 pgs.
"U.S. Appl. No. 14/658,579, Final Office Action dated Oct. 21, 2015", 10 pgs.
"U.S. Appl. No. 14/658,579, Non Final Office Action dated Mar. 16, 2016", 5 pgs.
"U.S. Appl. No. 14/658,579, Non Final Office Action dated Jul. 1, 2015", 9 pgs.
"U.S. Appl. No. 14/658,579, Notice of Allowance dated Nov. 2, 2016", 5 pgs.
"U.S. Appl. No. 14/658,579, Prliminary Amendment filed Mar. 18, 2015", 8 pgs.
"U.S. Appl. No. 14/658,579, Response Filed Oct. 14, 2016 to Final Office Action dated Jul. 14, 2016", 9 pgs.
"U.S. Appl. No. 14/658,579, Response filed Feb. 22, 2016 to Final Office Action dated Oct. 21, 2015", 11 pgs.
"U.S. Appl. No. 14/658,579, Response Filed Jun. 16, 2016 to Non-Final Office Action dated Mar. 16, 2016", 9 pgs.
"U.S. Appl. No. 14/658,579, Response filed Oct. 1, 2015 to Non Final Office Action dated Jul. 1, 2015", 11 pgs.
"U.S. Appl. No. 14/658,579, Response filed Oct. 20, 2016 to Final Office Action dated Jul. 14, 2016", 9 pgs.
"U.S. Appl. No. 15/005,783 Preliminary Amendment Filed May 26, 2016", 9 pgs.
"Application Serial No. PCT/US2011/052006, International Republished Application dated Jun. 7, 2012", 1 pg.
"Chinese Application Serial No. 2010800423190, Office Action dated Mar. 26, 2014", 13 pgs.

(56) References Cited

OTHER PUBLICATIONS

"Chinese Application Serial No. 201180044919.5, Office Action dated Apr. 25, 2016", w/ English Translation, 7 pgs.
"Chinese Application Serial No. 201180044919.5, Office Action dated Jun. 25, 2015", w/ English Translation, 8 pgs.
"Chinese Application Serial No. 201180044919.5, Response filed Jan. 11, 2016 to Office Action dated Jun. 25, 2015", with English machine translation, 22 pgs.
"Chinese Application Serial No. 201180044919.5, Response filed May 12, 2016 to Office Action dated Apr. 25, 2016", w/ English Translation, 13 pgs.
"Chinese Application Serial No. 201180054796.3, Office Action dated Jan. 16, 2014", with English translation of claims, 8 pgs.
"Chinese Application Serial No. 201180054796.3, Office Action dated Jan. 30, 2015", with English translation of claims, 5 pgs.
"Chinese Application Serial No. 201180054796.3, Office Action dated Jun. 4, 2015", w/ English Translation, 7 pgs.
"Chinese Application Serial No. 201180054796.3, Office Action dated Sep. 4, 2014", w/English Claims, 11 pgs.
"Chinese Application Serial No. 201180054796.3, Response filed Jun. 30, 2014 to Office Action dated Jan. 16, 2014", w/English Claims, 3 pgs.
"Chinese Application Serial No. 201180054796.3, Response filed Nov. 19, 2014 to Office Action dated Sep. 4, 2014", with English translation of claims, 7 pgs.
"Chinese Application Serial No. 201180054796.3, Response filed Apr. 14, 2015 to Office Action dated Jan. 30, 2015", w/ English Claims, 30 pgs.
"Chinese Application Serial No. 201180055823.9, Office Action dated Mar. 19, 2015", w/ English Claims, 8 pgs.
"Chinese Application Serial No. 201180055823.9, Office Action dated Nov. 17, 2015", w/ English Translation, 8 pgs.
"Chinese Application Serial No. 201180055823.9, Response filed Feb. 2, 2016 to Office Action dated Nov. 17, 2015", (English Translation of Claims), 15 pgs.
"Chinese Application Serial No. 201180055823.9,Response filed Aug. 3, 2015 to Office Action dated Mar. 19, 2015", w/ English Translation, 14 pgs.
"Chinese Application Serial No. 201180055845.5, Office Action dated Mar. 4, 2015", w/ English Claims, 8 pgs.
"Chinese Application Serial No. 201180055845.5, Office Action dated Aug. 5, 2015", w/ English Translation, 5 pgs.
"Chinese Application Serial No. 201180055845.5, Response filed Nov. 20, 2015 to Office Action dated Aug. 5, 2015", With English Claims, 9 pgs.
"Chinese Application Serial No. 201180055845.5,Response filed Jul. 13, 2015 to Office Action dated Mar. 4, 2015", w/ English Translation, 17 pgs.
"Chinese Application Serial No. 201380007588.7, Notification to Make Rectification dated Aug. 18, 2014", w/English Translation, 2 pgs.
"Chinese Application Serial No. 201380007615.0, Notification to Make Rectification dated Aug. 18, 2014", w/English Translation, 2 pgs.
"Chinese Application Serial No. 201380007615.0, Office Action dated May 6, 2015", w/ English Claims, 7 pgs.
"Chinese Application Serial No. 201380007615.0, Response filed Jan. 5, 2016 to Office Action dated May 6, 2015", w/ English Claims, 13 pgs.
"Chinese Application Serial No. 201380007615.0, Response filed Oct. 24, 2014", with English translation, 3 pgs.
"Chinese Application Serial No. 201380007615.0, Response filed Nov. 23, 2015 to Office Action dated May 6, 2015", With English Claims, 15 pgs.
"European Application Serial No. 10806751.3, Extended European Search Report dated Jan. 7, 2014", 7 pgs.
"European Application Serial No. 118260070.2, Office Action dated Mar. 12, 2014", 1 pg.
"European Application Serial No. 11826069.4, Extended European Search Report dated Jul. 23, 2015", 8 pgs.
"European Application Serial No. 11826069.4, Response filed Feb. 22, 2016 to Extended European Search Report dated Jul. 23, 2015", W/ English Translation, 26 pgs.
"European Application Serial No. 11826070.2, Extended European Search Report dated Feb. 21, 2014", 5 pgs.
"European Application Serial No. 11826070.2, Response filed Sep. 19, 2014 to Office Action dated Mar. 12, 2014", 11 pgs.
"European Application Serial No. 11826071.0, Examination Notification Art. 94(3) dated Dec. 11, 2014", 4 pgs.
"European Application Serial No. 11826071.0, Extended European Search Report dated Feb. 20, 2014", 6 pgs.
"European Application Serial No. 11826071.0, Office Action dated Mar. 12, 2014", 1 pg.
"European Application Serial No. 11826071.0, Response filed Sep. 19, 2014 to Office Action dated Mar. 12, 2014", 20 pgs.
"European Application Serial No. 11826071.0, Response filed Apr. 13, 2015 to Examination Notification Art. 94(3) dated Dec. 11, 2014", 5 pgs.
"International Application Serial No. PCT/US2010/002166, International Preliminary Report on Patentability dated Feb. 16, 2012", 6 pgs.
"International Application Serial No. PCT/US2010/002166, International Search Report dated Feb. 28, 2011", 3 pgs.
"International Application Serial No. PCT/US2010/002166, Written Opinion dated Feb. 28, 2011", 4 pgs.
"International Application Serial No. PCT/US2011/052006, International Preliminary Report on Patentability dated Mar. 28, 2013", 7 pgs.
"International Application Serial No. PCT/US2011/052006, Search Report dated Apr. 16, 2012", 3 pgs.
"International Application Serial No. PCT/US2011/052006, Written Opinion dated Apr. 16, 2012", 5 pgs.
"International Application Serial No. PCT/US2011/052061, International Preliminary Report on Patentability dated Mar. 28, 2013", 6 pgs.
"International Application Serial No. PCT/US2011/052061, International Search Report dated Apr. 10, 2012", 3 pgs.
"International Application Serial No. PCT/US2011/052061, Written Opinion dated Apr. 10, 2012", 4 pgs.
"International Application Serial No. PCT/US2011/052064, International Preliminary Report on Patentability dated Mar. 28, 2013", 5 pgs.
"International Application Serial No. PCT/US2011/052064, Search Report dated Feb. 29, 2012", 3 pgs.
"International Application Serial No. PCT/US2011/052064, Written Opinion dated Feb. 29, 2012", 3 pgs.
"International Application Serial No. PCT/US2011/052065, International Preliminary Report on Patentability dated Mar. 28, 2013", 7 pgs.
"International Application Serial No. PCT/US2011/052065, International Search Report dated Apr. 10, 2012", 3 pgs.
"International Application Serial No. PCT/US2011/052065, Written Opinion dated Apr. 10, 2012", 5 pgs.
"International Application Serial No. PCT/US2013/021411, International Preliminary Report on Patentability dated Aug. 14, 2014", 7 pgs.
"International Application Serial No. PCT/US2013/021411, International Search Report dated Apr. 30, 2013", 5 pgs.
"International Application Serial No. PCT/US2013/021411, Written Opinion dated Apr. 30, 2013", 5 pgs.
"International Application Serial No. PCT/US2013/023877, International Preliminary Report on Patentability dated Aug. 14, 2014", 7 pgs.
"International Application Serial No. PCT/US2013/023877, International Search Report dated May 14, 2013", 3 pgs.
"International Application Serial No. PCT/US2013/023877, Written Opinion dated May 14, 2013", 5 pgs.
"International Application Serial No. PCT/US2013/024138, International Preliminary Report on Patentability dated Aug. 14, 2014", 6 pgs.
"International Application Serial No. PCT/US2013/024138, International Search Report dated May 24, 2013", 3 pgs.

(56) References Cited

OTHER PUBLICATIONS

"International Application Serial No. PCT/US2013/024138, Written Opinion dated May 24, 2013", 4 pgs.
"International Application Serial No. PCT/US2013/024149, Written Opinion mailed", 4 pages.
"International Application Serial No. PCT/US2013/024149, International Preliminary Report on Patentability dated Aug. 14, 2014", 6 pgs.
"International Application Serial No. PCT/US2013/024149, International Search Report mailed", 7 pages.
"Korean Application Serial No. 10-2013-7009777, Office Action dated Jan. 27, 2014", 5 pgs.
"Korean Application Serial No. 10-2013-7009777, Office Action dated Sep. 17, 2013", w/English Translation, 8 pgs.
"Korean Application Serial No. 10-2013-7009777, Response filed Apr. 28, 2014", w/English Claims, 19 pgs.
"Korean Application Serial No. 10-2013-7009777, Response filed Nov. 5, 2013 to Office Action dated Sep. 17, 2013", 11 pgs.
"Korean Application Serial No. 10-2013-7009790, Office Action dated Aug. 26, 2013", W/English Translation, 7 pgs.
"Korean Application Serial No. 10-2013-7009790, Response filed Aug. 26, 2013 to Office Action dated Jun. 26, 2013", w/English Claims, 11 pgs.

Acar, Cenk, et al., "Chapter 4: Mechanical Design of MEMS Gyroscopes", MEMS Vibratory Gyroscopes: Structural Approaches to Improve Robustness, Springer, (2009), 73-110.
Acar, Cenk, et al., "Chapter 6: Linear Multi DOF Architecture—Sections 6.4 and 6.5", MEMS Vibratory Gyroscopes: Structural Approaches to Improve Robustness, Springer, (2009), 158-178.
Acar, Cenk, et al., "Chapter 7: Torsional Multi-DOF Architecture", MEMS Vibratory Gyroscopes: Structural Approaches to Improve Robustness, Springer, (209), 187-206.
Acar, Cenk, et al., "Chapter 8: Distributed-Mass Architecture", MEMS Vibratory Gyroscopes: Structural Approaches to Improve Robustness, Springer, (2009), 207-224.
Acar, Cenk, et al., "Chapter 9: Conclusions and Future Trends", MEMS Vibratory Gyroscopes: Structural Approaches to Improve Robustness, Springer, (2009), 225-245.
Ezekwe, Chinwuba David, "Readout Techniques for High-Q Micromachined Vibratory Rate Gyroscopes", Electrical Engineering and Computer Sciences University of California at Berkeley, Technical Report No. UCB/EECS-2007-176, http://www.eecs.berkeley.edu/Pubs/TechRpts/2007/EECS-2007-176.html, (Dec. 21, 2007), 94 pgs.

* cited by examiner

ACCELEROMETER TECHNIQUES TO COMPENSATE PACKAGE STRESS

TECHNICAL FIELD

This document relates generally to accelerometers and more particularly to techniques to mitigate package stress effects of microelectromechanical system (MEMS) accelerometers.

OVERVIEW

Techniques for compensating package stress of a proof mass are provided. In an example, a proof mass can be suspended from a substrate by a proof mass anchor. The first proof mass can have a major surface that defines a first plane. Portions of electrodes forming part of the proof mass can be symmetric with each other across a first line, wherein the first line bisects the first proof mass anchor, extends parallel to the first plane and extends between the first electrode and the second electrode.

This overview is intended to provide a general overview of subject matter of the present patent application. It is not intended to provide an exclusive or exhaustive explanation of the invention. The detailed description is included to provide further information about the present patent application.

BACKGROUND

MEMS accelerometers can provide movement information for small devices such as, but not limited to, personal digital assistants, portable communication devices, portable media players, wearable electronics, etc. However, stresses of the components within the MEMS accelerometers and stresses that may result from assembling and packaging the MEMS accelerometers can affect the accuracy or precision of the information generated by the MEMS accelerometers.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized techniques for improving robustness of a MEMS accelerometer to package stress. In certain examples, an accelerometer can include enhanced differential electrode structures to reject and cancel out structural deformations due to package stress. Several examples of such enhanced electrode structures are discussed below. In certain examples, the structures can provide acceleration information for movement along multiple axes. In certain examples, the accelerometer can include a proof mass structure that has a major surface that defines a plane. One or more portions of the proof mass structure can move in a primarily out-of-plane direction to acceleration perpendicular to the plane. The present inventors have recognized that if the electrodes associated with the output plane movement of the proof mass are arranged symmetrically with an anchor of the one or more portions and close to the anchor, anomalies of the one or more proof mass portions associated with, for example, package stress, such as, but not limited to, package stress due to acceleration deformation of the accelerometer substrate or acceleration deformation of a proof mass, can be canceled using the techniques discussed below. In some applications, locating an electrode in close proximity to the proof mass anchor can be contradictory to providing an electrode that provides high acceleration accuracy. In general, electrodes that provide high acceleration accuracy are located distal from the proof mass anchor where proof mass deflection due to the acceleration is designed to be greatest. However, package stress caused by, but not limited to, processing temperatures, ambient operating temperature, overmold pressure, mold type, board type, board mounting, or combinations thereof, can result in deformations of the substrate or the proof mass. These unanticipated deformations can be greatest at locations distal from the proof mass anchor and can be asymmetric with respect to the proof mass anchor. Thus, high accuracy accelerometer designs can be corrupted by effects of package stress when the electrodes are located distal from the proof mass anchor.

Figure 1A:
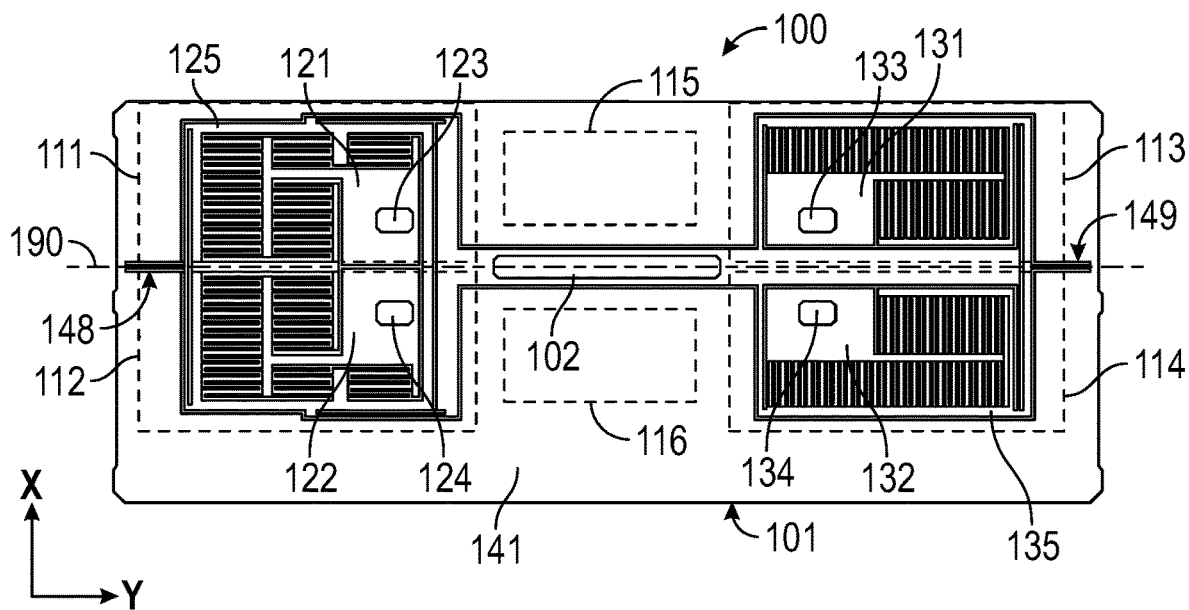
FIGS. 1A and 1B illustrate generally an example of a proof mass structure for an example MEMS accelerometer.
Figure 1B:
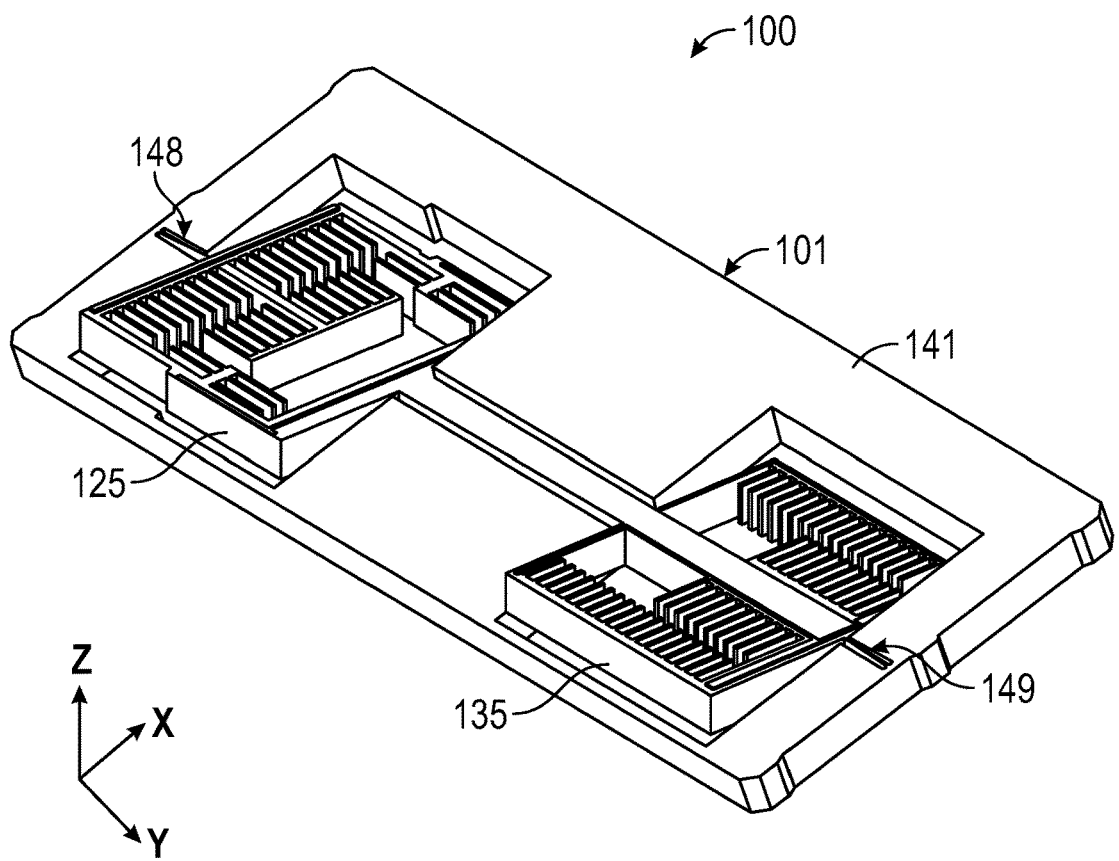

FIGS. 1A and 1B illustrate generally an example of a proof mass structure 100 for an example MEMS accelerometer. FIG. 1A illustrates a plan view of the proof mass structure 100 and FIG. 1B illustrates generally a perspective view of the proof mass structure 100 as the structure reacts to acceleration perpendicular to a plane defined by a major surface of the proof mass structure 100. The proof mass structure 100 can include a single proof mass 101 for up to three axes, a single, elongated, central anchor 102 for attaching the proof mass 101 to a substrate (not shown) and for suspending the proof mass 101 to allow for out-of-plane deflection, and differential electrodes 111-116 for one or more of the axes.

As used herein, an electrode can include two components that act as a capacitor or charge storage structure. One portion of the electrode is typically fixed in a rigid fashion to the substrate. The other portion of the electrode is part of a proof mass and is designed to deflect in response to acceleration along or around an axis. FIG. 1A illustrates a plan view of the proof mass structure 100 in an example x-y reference plane. The example x-y reference plane corresponds to a plane parallel to the major surfaces of the proof mass structure 100. The proof mass 101 can include moveable portions for up to 6 electrodes or more, with at least 2 electrodes for each of the 3 possible axes (x,y,z).

X-axis electrodes 111, 112 can each include a stationary portion 121, 122 attached to and suspended from the substrate by an electrode anchor 123, 124, and a moveable portion 125 forming a part of the proof mass 101. The shape of the two portions 123, 124, 125 of each electrode include corresponding comb-like structures that interleave. In certain examples, while the proof mass structure 100 is at rest, for each x-axis electrode 111, 112 of the differential electrode pair, a tooth of the moveable portion 125 is positioned between two teeth of the stationary portion 123, 124 and vice-versa. In some examples, a tooth of one portion can be located closer to one of the two corresponding interleaved teeth of the other portion while the proof mass structure is at rest. For differential electrodes, the tooth may be closer to a tooth in the positive x-direction for one electrode and a corresponding tooth can be closer to a tooth in the negative x-direction for the other electrode. When the proof mass 101 accelerates along the x-axis, the moveable portion 125 can deflect in-plane, or parallel to the example x-y plane, and can change the distance between teeth of the interleaved electrode structures. The change in distance between teeth of the interleaved electrode structures can provide an electrical signal, single-ended from a single electrode or differential from a pair of electrodes, that indicates a magnitude of the acceleration in the x-direction. In certain examples, the two x-axis electrodes 111, 112 are arranged symmetrically about a line 190 that passes between the two x-axis electrodes 111, 112 and length-wise bisects the elongated central anchor 102.

Y-axis electrodes 113, 114 can each include a stationary portion 131, 132 attached to and suspended from the substrate by an electrode anchor 133, 134 and a moveable portion 135 forming a part of the proof mass 101. The shape of the two portions of each electrode can include corresponding comb-like structures that interleave. In certain examples, while the proof mass structure 100 is at rest, for each y-axis electrode 113, 114 of the differential electrode pair, a tooth of the moveable portion 135 is positioned between two teeth of the stationary portion 131, 132 and vice-versa. In some examples, a tooth of one portion can be located closer to one of the two corresponding interleaved teeth of the other portion while the proof mass structure 100 is at rest. For differential electrodes, the tooth may be closer to a tooth in the positive y-direction for one electrode and a corresponding tooth can be closer to a tooth in the negative y-direction for the other electrode. When the proof mass accelerates along the y-axis, the moveable portion 135 can deflect in-plane, or parallel to the example x-y plane, and can change the distance between teeth of the interleaved electrode structures. The change in distance between teeth of the interleaved electrode structures can provide an electrical signal, single-ended from a single electrode or differential from a pair of electrodes, that indicates a magnitude of the acceleration in the y-direction. In certain examples, the two y-axis electrodes 113, 114 are arranged symmetrically about a line 190 that passes between the two y-axis electrodes 113, 114 and length-wise bisects the elongated central anchor 102.

Z-axis electrodes 115, 116 can each include a stationary portion (not shown) attached to or integrated with the substrate, and a moveable portion 141 forming a part of the proof mass 101. In certain examples, the stationary portion of each z-axis electrode 115, 116 forms a first capacitor plate and the moveable portion 141 of each z-axis electrode 115, 116 forms a second corresponding capacitor plate. As illustrated in FIG. 1B, a z-axis portion of the proof-mass can rotate about suspensions 148, 149 or connections of the z-axis portion that connect the moveable portion 141 of the z-axis electrodes 115, 116 to the rest of the proof mass 101. In certain examples, the moveable portion 141 of the z-axis electrodes 115, 116 can be asymmetrical along a line 190 length-wise bisecting the central anchor 102 to allow for the deflection. Such asymmetry can provide the moveable portion 141 with a high inertia moment area. The high inertia moment area can provide a mass that is located at a large radius from the suspensions 148, 149 or connections. The asymmetric mass located at a large radius from the suspensions 148, 149 can provide a relatively large inertial torque in response to an acceleration along the z-axis. In certain examples, the z-axis electrodes 115, 116 can be symmetrical to the line 190 and can be located close to the central anchor 102. Such a symmetric and close relationship to the central anchor 102 can assist in cancelling effects of package stress of the proof mass structure because anomalies associated with package stress can often be distributed evenly with respect to the central anchor 102, thus, the close proximity to the central anchor 102 and symmetric layout of the differential z-axis electrodes 115, 116 can allow for effects of package stress to cancel each other.

Figure 2A:
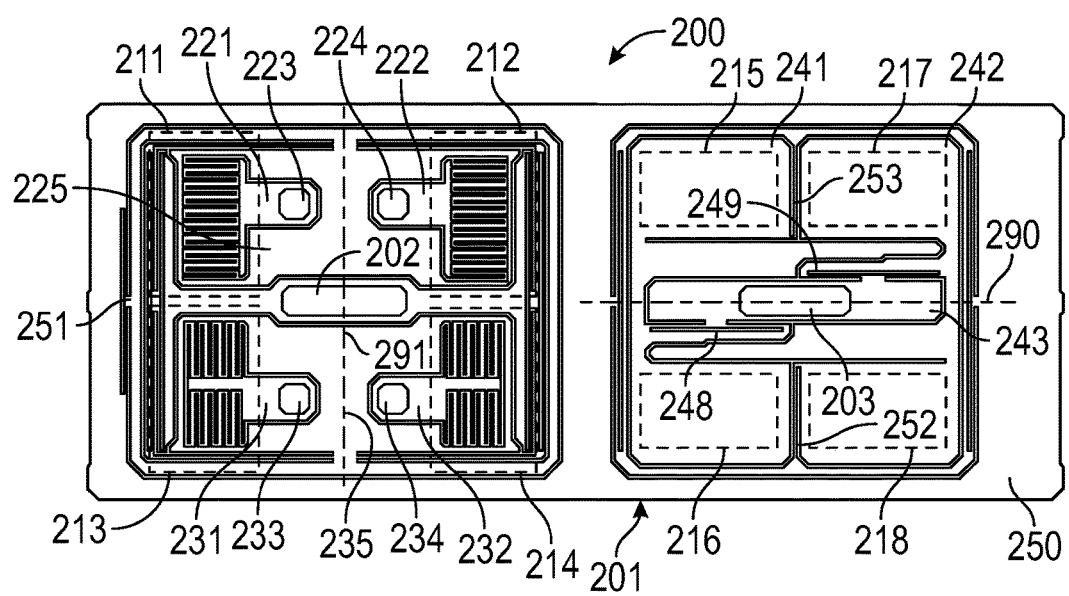
FIGS. 2A and 2B illustrate generally an example of a proof mass structure for an example MEMS accelerometer.
Figure 2B:
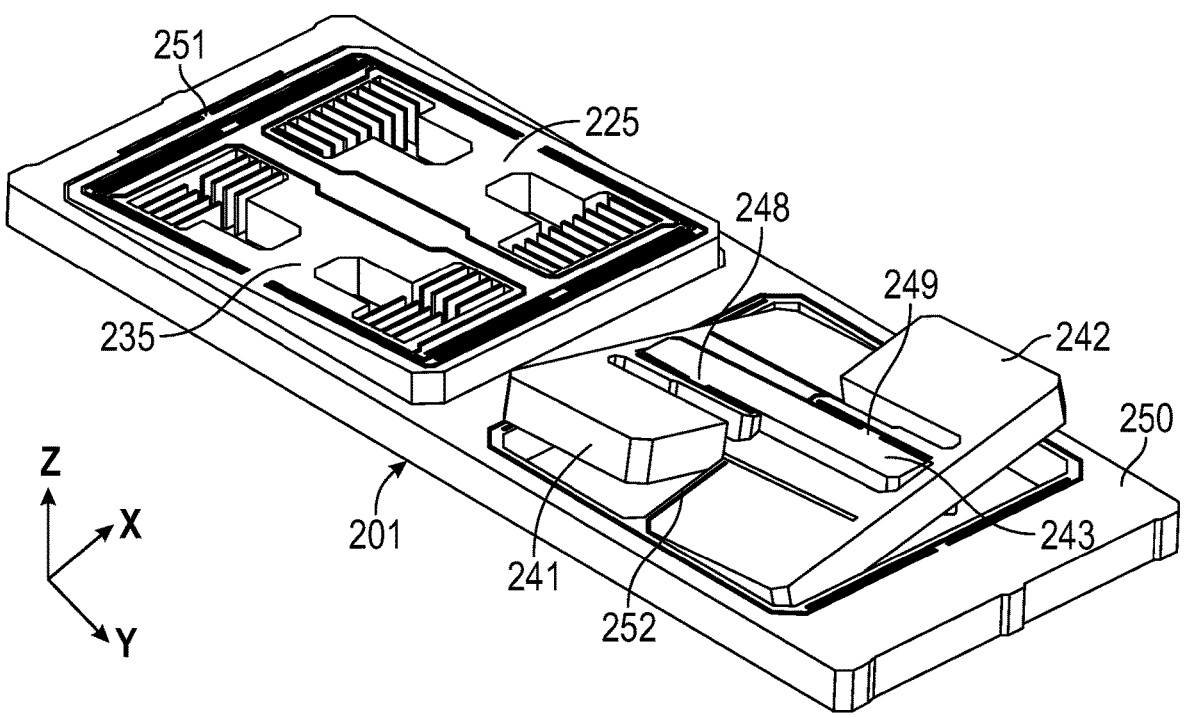

FIGS. 2A and 2B illustrate generally an example of a proof mass structure 200 for an example MEMS accelerometer. FIG. 2A illustrates a plan view of the proof mass structure 200 and FIG. 2B illustrates generally a perspective view of the proof mass structure 200 as the structure reacts to acceleration perpendicular to a plane defined by a major surface of the proof mass structure 200. The proof mass structure 200 can include a single proof mass 201 for up to three axes, two elongated, central anchors 202, 203 for attaching the proof mass 201 to a substrate (not shown) and for suspending the proof mass 201 to allow for deflection, and differential electrodes 211-218 for one or more of the x, y and z axes.

FIG. 2A illustrates a plan view of the proof mass structure 200 in an example x-y reference plane. The example x-y reference plane corresponds to a plane parallel to the major surfaces of the proof mass structure 200. The proof mass can include moveable portions of up to 8 electrodes, 2 electrodes for each of the x and y axes and 4 electrodes for the z-axis.

X-axis electrodes 211, 212 can each include a stationary portion 221, 222 attached to and suspended from the substrate by an electrode anchor 223, 224, and a moveable portion 225 forming a part of the proof mass 201. The shape of the two portions 221, 222, 225 of each electrode 211, 212 include corresponding comb-like structures that interleave. In certain examples, while the proof mass structure 200 is at rest, for each electrode 211, 212 of the x-axis differential electrode pair, a tooth of the moveable portion 225 is positioned between two teeth of the stationary portion 221, 222, 225 and vice-versa. In some examples, a tooth of one portion can be located closer to one of the two corresponding interleaved teeth of the other portion while the proof mass structure 200 is at rest. For differential electrodes, the tooth may be closer to a tooth in the positive x-direction for one electrode and a corresponding tooth can be closer to a tooth in the negative x-direction for the other electrode. When the proof mass 201 accelerates along the x-axis, the moveable portion 225 can deflect in-plane, or parallel to the example x-y plane, and can change the distance between teeth of the interleaved electrode structures. The change in distance between teeth of the interleaved electrode structures can provide an electrical signal, single-ended from a single electrode or differential from a pair of electrodes, that indicates a magnitude of the acceleration in the x-direction. In certain examples, the two x-axis electrodes 211, 212 are arranged symmetrically about a line 291 that passes between the two x-axis electrodes 211, 212 and width-wise bisects a first, elongated central anchor 202.

Y-axis electrodes 213, 214 can each include a stationary portion 231, 232 attached to and suspended from the substrate by an electrode anchor 233, 234, and a moveable portion 235 forming a part of the proof mass 201. The shape of the two portions 231, 232, 235 of each y-axis electrode 213, 214 include corresponding comb-like structures that interleave. In certain examples, while the proof mass structure 200 is at rest, for each y-axis electrode 213, 214 of the differential electrode pair, a tooth of the moveable portion 235 is positioned between two teeth of the stationary portion 231, 232 and vice-versa. In some examples, a tooth of one portion can be located closer to one of the two corresponding interleaved teeth of the other portion while the proof mass structure 200 is at rest. For differential electrodes, the tooth may be closer to a tooth in the positive y-direction for one electrode and a corresponding tooth can be closer to a tooth in the negative y-direction for the other electrode. When the proof mass 201 accelerates along the y-axis, the moveable portion 235 can deflect in-plane, or parallel to the example x-y plane, and can change the distance between teeth of the interleaved electrode structures. The change in distance between teeth of the interleaved electrode structures can provide an electrical signal, single-ended from a single electrode or differential from a pair of electrodes, that indicates a magnitude of the acceleration in the y-direction. In certain examples, the two y-axis electrodes 213, 214 are arranged symmetrically about the line 291 that passes between the two y-axis electrodes 213, 214 and width-wise bisects the first elongated central anchor 202.

Z-axis electrodes 215, 216, 217, 218 can each include a stationary portion (not shown) attached to or integrated with the substrate, and a moveable portion 241, 242 forming a part of the proof mass 201. In certain examples, the stationary portion of each z-axis electrode 215-218 forms a first capacitor plate and the moveable portion 241, 242 of each z-axis electrode forms a second corresponding capacitor plate. As illustrated in FIG. 2B, the moveable portions of the z-axis electrodes 215-218 can include two sub-portions 241, 242 that can rotate about a suspensions 248, 249 or connections coupling each sub-portion 241, 242 to a central z-axis portion 243. The central z-axis portion 243 can be directly coupled to a second central anchor 203 of the two central anchors 202, 203. In certain examples, the sub-portions 241, 242 of the proof mass can be asymmetrical along a line 290 length-wise bisecting the second central anchor 203 to allow for the deflection. Such asymmetry can provide each z-axis sub-portion 241, 242 with a high inertia moment area. The high inertia moment area can provide a mass that is located at a large radius from the suspensions 248, 249 that couple the corresponding sub-portion 248, 249 to the central z-axis portion 243. The asymmetric mass located at a large radius from the suspensions 248, 249 can provide a relatively large inertial torque in response to an acceleration along the z-axis. In certain examples, each z-axis sub portion 241, 242 can be associated with two electrodes such that the accelerometer includes 4 z-axis electrodes 215-218 or two pairs of differential z-axis electrodes 215, 216 and 217, 218. In certain examples, the z-axis electrode 215-218 can be symmetrical to the line 290 and can be located close to the second central anchor 203. In some examples, the layout of the z-axis electrodes 215-218 can have diagonal symmetry or 180° rotational symmetry about the second central anchor 203. Such a symmetric and close relationship to the second central anchor 203 can assist in cancelling effects of package stress of the proof mass structure 200 because anomalies associated with package stress can often be distributed evenly with respect to the second central anchor 203, thus, the close proximity to the second central anchor 203 and symmetric layout of the differential z-axis electrodes 215-218 can allow for effects of package stress to cancel each other.

The proof mass structure 200 can also include a frame 250 extending around the exterior of the proof mass 201 and connected via flexures 251, 252, 253 to the movable portions 225, 235, 241, 242 of each axis of the single proof mass 201. The fabrication of the single proof mass 201 can allow for precision alignment of the moveable portions 225, 235, 241, 242 along their respective axes compared to separated proof masses that rely on not only the fabrication of each proof mass but also the correct alignment when coupling independent proof masses to the substrate.

Figure 3A:
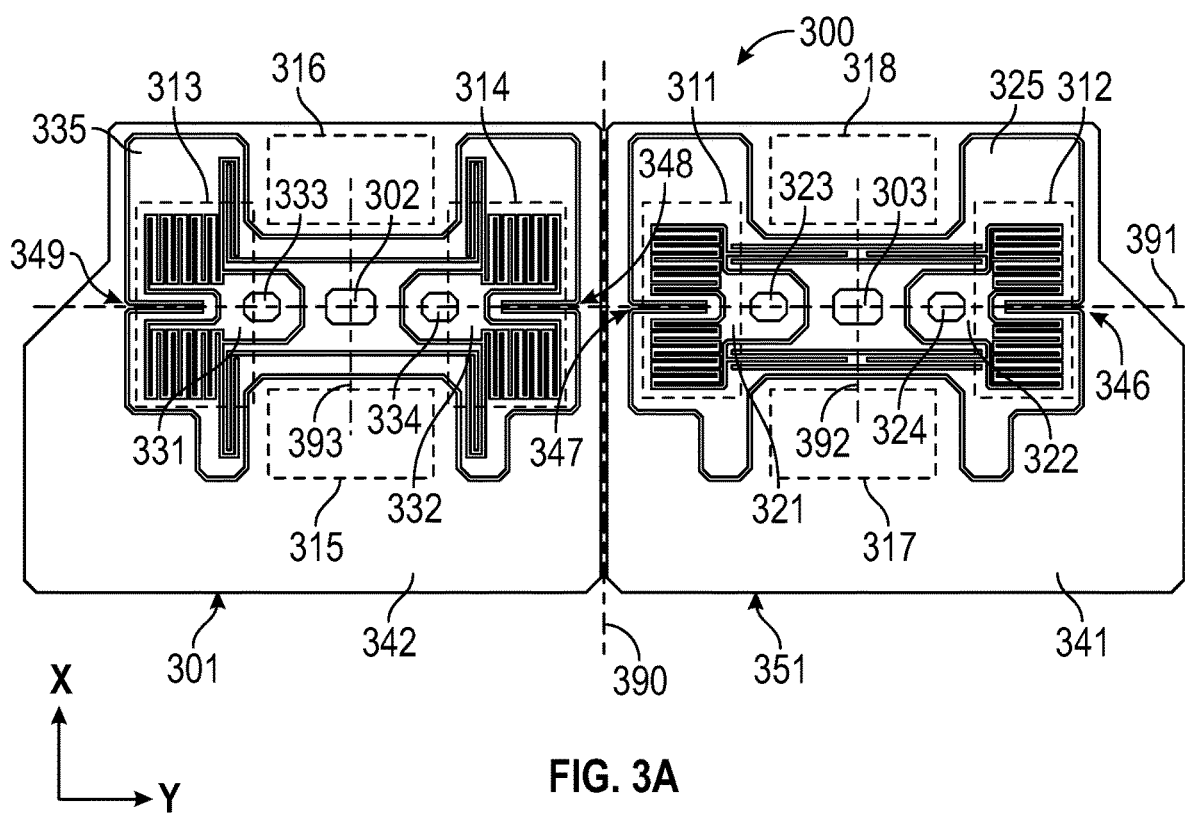
FIGS. 3A and 3B illustrate generally an example of a proof mass structure for an example MEMS accelerometer.
Figure 3B:
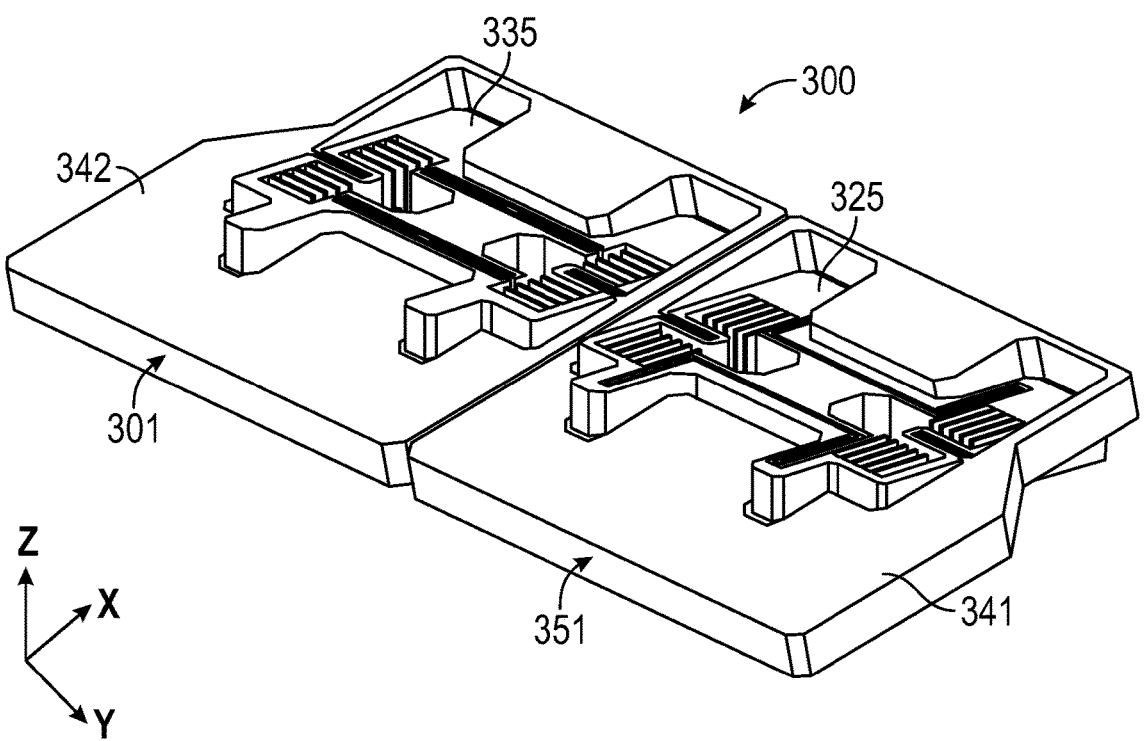

FIGS. 3A and 3B illustrate generally an example of a proof mass structure 300 for an example MEMS accelerometer. FIG. 3A illustrates a plan view of the proof mass structure 300 and FIG. 3B illustrates generally a perspective view of the proof mass structure 300 as the structure reacts to acceleration perpendicular to a plane defined by a major surface of the proof mass structure 300. The proof mass structure 300 can include a two proof masses 301, 351 for up to three axes, two elongated, proof mass anchors 302, 303 for attaching each proof mass 301, 351 to a substrate (not shown) and for suspending the proof masses 301, 351 to allow for deflection, and differential electrodes 311-318 for one or more of the axes. In a three axis accelerometer, a first proof mass 301 can detect y-axis and z-axis acceleration and a second proof mass 351 can detect x-axis and z-axis acceleration FIG. 3A illustrates a plan view of the proof mass structure 300 in an example x-y reference plane. The example x-y reference plane corresponds to a plane parallel to the major surfaces of the proof mass structure 300. The proof masses can include moveable portions 325, 335, 341, 342 for at least 8 electrodes, 2 electrodes 311, 312, 313, 314 for each of the x and y axes and 4 electrodes 315-318 for the z-axis.

X-axis electrodes 311, 312 can each include a stationary portion 321, 322 attached to and suspended from the substrate by an electrode anchor 323, 324, and a moveable portion 325 forming a part of a second proof mass 351. The shape of the two portions of each electrode 311, 312 include corresponding comb-like structures that interleave. In certain examples, while the proof mass structure 300 is at rest, for each electrode 311, 312 of the differential x-axis electrode pair, a tooth of the moveable portion 325 is positioned between two teeth of the stationary portion 321, 322 and vice-versa. In some examples, a tooth of one portion can be located closer to one of the two corresponding interleaved teeth of the other portion while the proof mass structure is at rest. For differential electrodes, the tooth may be closer to a tooth in the positive x-direction for one electrode and a corresponding tooth can be closer to a tooth in the negative x-direction for the other electrode. When the proof mass 351 accelerates along the x-axis, the moveable portion 325 can deflect in-plane, or parallel to the example x-y plane, and can change the distance between teeth of the interleaved electrode structures. The change in distance between teeth of the interleaved electrode structures can provide an electrical signal, single-ended from a single electrode or differential from a pair of electrodes, that indicates a magnitude of the acceleration in the x-direction. In certain examples, the two x-axis electrodes 311, 312 are arranged symmetrically about a line 391 that passes between the two x-axis electrodes and length-wise bisects a second proof mass anchor 303. In certain examples, the two x-axis electrodes 311, 312 are arranged symmetrically about a line 391 that bisects each x-axis electrode 311, 312 and length-wise bisects a second proof mass anchor 303. In certain examples, the stationary portions 321, 322, as well as, the two x-axis electrodes 311, 312, are arranged symmetrically about a line 392 that passes between the two x-axis electrodes 311, 312 and width-wise bisects the second proof mass anchor 303.

Y-axis electrodes 313, 314 can each include a stationary portion 331, 332 attached to and suspended from the substrate by an anchor 333, 334, and a moveable portion 335 forming a part of the first proof mass 301. The shape of the two portions of each electrode 313, 314 include corresponding comb-like structures that interleave. In certain examples, while the proof mass structure 300 is at rest, for each electrode 313, 314 of the differential y-axis electrode pair, a tooth of the moveable portion 335 is positioned between two teeth of the stationary portion 321, 322 and vice-versa. In some examples, a tooth of one portion can be located closer to one of the two corresponding interleaved teeth of the other portion while the proof mass structure 300 is at rest. For differential electrodes, the tooth may be closer to a tooth in the positive y-direction for one electrode and a corresponding tooth can be closer to a tooth in the negative y-direction for the other electrode. When the proof mass accelerates along the y-axis, the moveable portion 335 can deflect in-plane, or parallel to the example x-y plane, and can change the distance between teeth of the interleaved electrode structures. The change in distance between teeth of the interleaved electrode structures can provide an electrical signal, single-ended from a single electrode or differential from a pair of electrodes, that indicates a magnitude of the acceleration in the y-direction. In certain examples, the two y-axis electrodes 313, 314 are arranged symmetrically about the line 391 that passes bisects the two y-axis electrodes 313, 314 and length-wise bisects the first proof mass anchor 302. In certain examples, the stationary portions 331, 332, as well as, the two y-axis electrodes 313, 314, are arranged symmetrically about a line 393 that passes between the two y-axis electrodes 313, 314 and width-wise bisects the first proof mass anchor 301.

Z-axis electrodes 315, 316, 317, 318, can each include a stationary portion (not shown) attached to or integrated with the substrate, and a moveable portion 341, 342 forming a part of each corresponding proof mass 301, 351. In certain examples, the stationary portion of each z-axis electrode 315, 316, 317, 318, forms a first capacitor plate and the moveable portion 341, 341 of each z-axis electrode 315, 316, 317, 318, forms a second corresponding capacitor plate. As illustrated in FIG. 3B, z-axis acceleration can be measured using two separate proof masses 301, 351 and 2 pairs of differential electrodes 315-316, 317-318. Each proof mass 301, 351 includes flexures 346, 347, 348, 349 that allow a moveable portion 341, 342 of each proof mass 301,351 to deflect in an out-of-plane fashion while allowing the x or y portion of the corresponding proof mass 301, 351 to remain fixed with regard to out-of-plane deflection while also allowing the moveable x or y portion 325, 335 of the corresponding proof mass 301, 351 to deflect or shuttle with in-plane motion in response to a corresponding acceleration in the x or y direction. In certain examples, the moveable z-axis portions 341, 341 of each proof mass 301, 351 can be asymmetrical along a line length-wise bisecting the proof mass anchors 302, 303. Such asymmetry can provide each moveable z-axis portion 341, 341 of each proof mass 301, 351 with a high inertia moment area. The high inertia moment area can provide a mass that is located at a large radius from the suspensions 346-348 that couple the moveable z-axis portion 341, 342 to the corresponding anchor 302, 303. The asymmetric mass located at a large radius from the suspensions can provide a relatively large inertial torque in response to an acceleration along the z-axis. In certain examples, each moveable z-axis portion 341, 341 of each proof mass 301, 351 can be associated with two electrodes such that the accelerometer includes 4 z-axis electrodes 315-318 or two pairs of differential z-axis electrodes 315-316, 317-318. In certain examples, the z-axis electrodes 315-318 can be symmetrical across the line 391 length-wise bisecting the proof mass anchors 301, 351 and can be located close to the respective anchor. Such a symmetric and close relationship to the a proof mass anchor 301, 351 can assist in cancelling effects of package stress of the proof mass structure 300 because anomalies associated with package stress can often be distributed evenly with respect to the proof mass anchor 301, 351, thus, the close proximity to the proof mass anchor 301, 351 and symmetric layout of the differential z-axis electrodes can allow for effects of package stress to cancel each other. In some examples, the layout of the z-axis portions 341, 342 of the individual proof masses 301, 351 can be symmetrical across a line 390 passing between the two proof masses 301, 351.

Figure 4A:
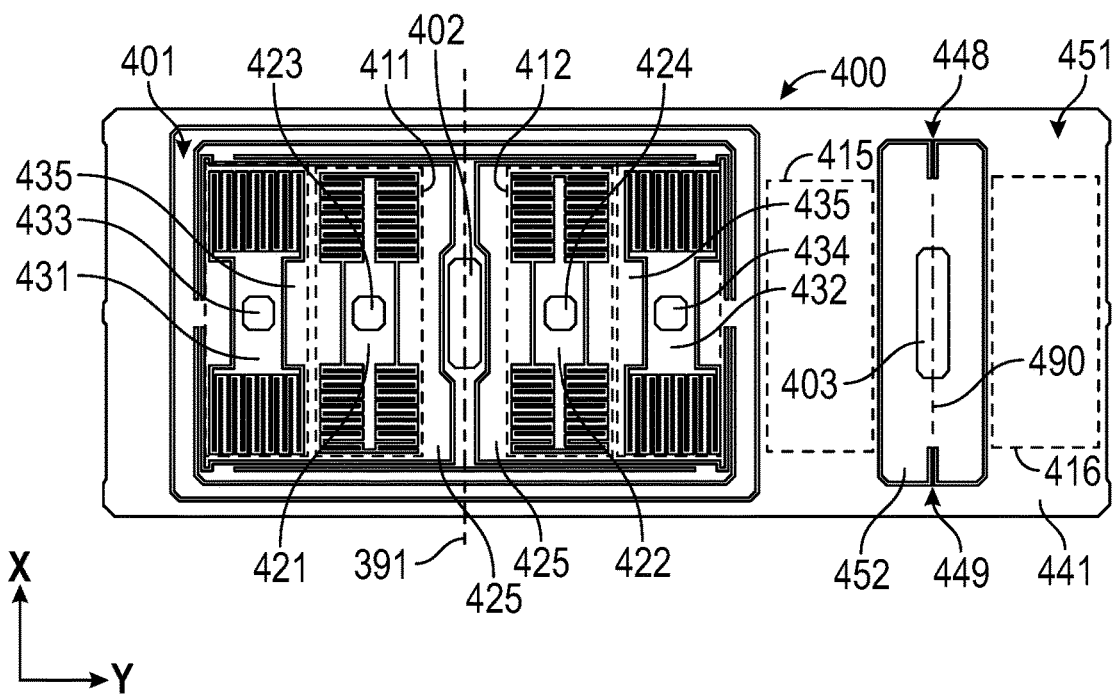
FIGS. 4A and 4B illustrate generally an example of a proof mass structure for an example MEMS accelerometer.
Figure 4B:
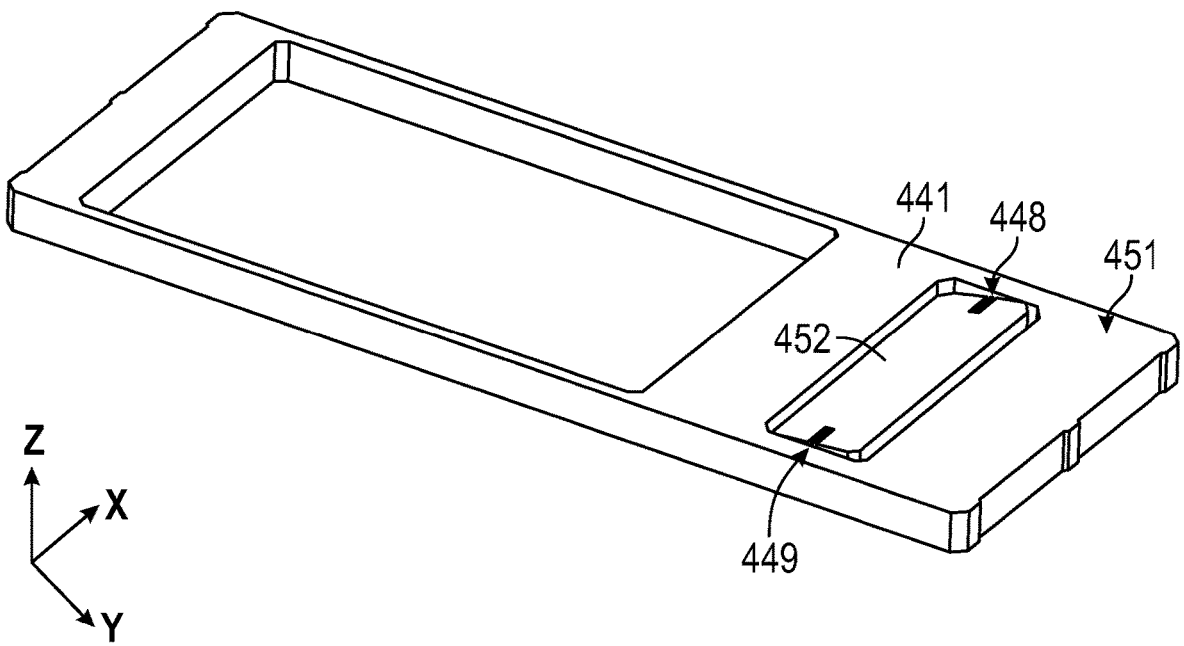

FIGS. 4A and 4B illustrate generally an example of a proof mass structure 400 for an example MEMS accelerometer. FIG. 4A illustrates a plan view of the proof mass structure 400 and FIG. 4B illustrates generally a perspective view of a z-axis proof mass 451 as the z-axis proof mass 451 reacts to acceleration perpendicular to a plane defined by a major surface of the proof mass structure 400. The proof mass structure 400 can include a two proof masses 401, 451 for up to three axes, two elongated, proof mass anchors 402, 403 for attaching each proof mass 401, 451 to a substrate (not shown) and for suspending the proof masses 401, 421 to allow for deflection, and differential electrodes 411-416 for one or more of the axes. In a three axis accelerometer, a first proof mass 401 can detect y-axis and x-axis acceleration and a second proof mass 451 can detect z-axis acceleration.

FIG. 4A illustrates a plan view of the proof mass structure 400 in an example x-y reference plane. The example x-y reference plane corresponds to a plane parallel to the major surfaces of the proof mass structure 400. The proof masses 401, 451 can include moveable portions for at least 6 electrodes, 2 electrodes for each of the x, y and z axes.

X-axis electrodes 411, 412 can each include a stationary portion 421, 422 attached to and suspended from the substrate by a pair of first electrode anchors 423, 424, and a moveable portion 425 forming a part of the first proof mass 401. The shape of the two portions 423, 424, 425 of each electrode include corresponding comb-like structures that interleave. In certain examples, while the proof mass structure 400 is at rest, for each x-electrode 411, 412 of the differential x-electrode pair, a tooth of the moveable portion 425 is positioned between two teeth of the stationary portion 421, 422 and vice-versa. In some examples, a tooth of one portion can be located closer to one of the two corresponding interleaved teeth of the other portion while the proof mass structure 400 is at rest. For differential electrodes, the tooth may be closer to a tooth in the positive x-direction for one electrode and a corresponding tooth can be closer to a tooth in the negative x-direction for the other electrode. When the first proof mass 401 accelerates along the x-axis, the moveable portion 425 can deflect in-plane, or parallel to the example x-y plane, and can change the distance between teeth of the interleaved electrode structures. The change in distance between teeth of the interleaved electrode structures can provide an electrical signal, single-ended from a single electrode or differential from a pair of electrodes, that indicates a magnitude of the acceleration in the x-direction. In certain examples, the two x-axis electrodes 411, 412 are arranged symmetrically about a line 391 that passes between the two x-axis electrodes 411, 412 and length-wise bisects the elongated, first, proof mass anchor 402. In certain examples, the two x-axis electrodes 411, 412 can be arranged symmetrically about a line 392 that bisects the two x-axis electrodes 411, 412 and width-wise bisects the elongated, first, proof mass anchor 402 and bisects the pair of first electrode anchors 423, 424.

Y-axis electrodes 413, 414 can each include a stationary portion 431, 432 attached to and suspended from the substrate by a pair of first electrode anchors 433, 434, and a moveable portion 435 forming a part of the first proof mass 401. The shape of the two portions 433, 434, 435 of each electrode include corresponding comb-like structures that interleave. In certain examples, while the proof mass structure 400 is at rest, for each y-electrode 413, 414 of the differential y-electrode pair, a tooth of the moveable portion 435 is positioned between two teeth of the stationary portion 431, 432 and vice-versa. In some examples, a tooth of one portion can be located closer to one of the two corresponding interleaved teeth of the other portion while the proof mass structure 400 is at rest. For differential electrodes, the tooth may be closer to a tooth in the positive y-direction for one electrode and a corresponding tooth can be closer to a tooth in the negative y-direction for the other electrode. When the first proof mass 401 accelerates along the y-axis, the moveable portion 435 can deflect in-plane, or parallel to the example x-y plane, and can change the distance between teeth of the interleaved electrode structures. The change in distance between teeth of the interleaved electrode structures can provide an electrical signal, single-ended from a single electrode or differential from a pair of electrodes, that indicates a magnitude of the acceleration in the y-direction. In certain examples, the two y-axis electrodes 413, 414 are arranged symmetrically about the line 391 that passes between the two y-axis electrodes 413, 414 and length-wise bisects the elongated, first, proof mass anchor 402. In certain examples, the two y-axis electrodes 413, 414 can be arranged symmetrically about the line 392 that bisects the two y-axis electrodes 413, 414 and width-wise bisects the elongated, first, proof mass anchor 402 and bisects the pair of first electrode anchors 433, 434.

Z-axis electrodes 415, 416 can each include a stationary portion attached to or integrated with the substrate (not shown), and a moveable portion 441 forming a part of the second proof mass. In certain examples, the stationary portion of each z-axis electrode 415, 416 forms a first capacitor plate and the moveable portion 441 of each z-axis electrode forms a second corresponding capacitor plate. As illustrated in FIG. 3B, z-axis acceleration can be measured using a pair of differential electrodes 415, 416. The second proof mass can include flexures 448, 449 that allow a portion 441 of the second proof mass 451 to deflect in an out-of-plane fashion. As illustrated in FIG. 4B, a moveable portion 441 of the second proof mass 451 can rotate about the flexures 448, 449 in response to acceleration in the z-axis direction. the moveable portion 441 of the second proof mass 451 can surround the first proof mass 401. In certain examples, the shape of the z-axis proof mass or the shape of the second proof mass 451 can be asymmetrical along a line 390 length-wise bisecting the second proof mass anchor 403 coupling the second proof mass 451 to the substrate. Such asymmetry can provide the second proof mass 451 with a high inertia moment area. The high inertia moment area can provide a mass that is located at a large radius from the suspensions, or flexures 448, 449, that couple the moveable portion 441 of the second proof mass 451 to a central z-axis portion 452 and to the corresponding second proof mass anchor 403. The asymmetric mass located at a large radius from the flexures 448, 449 can provide a relatively large inertial torque in response to an acceleration along the z-axis. In certain examples, the z-axis electrodes 415, 416 can be symmetrical to the line 390 and can be located close to the second proof mass anchor 403. Such a symmetric and close relationship to the corresponding anchor can assist in cancelling effects of package stress of the proof mass structure because anomalies associated with package stress can often be distributed evenly with respect to the central anchor, thus, the close proximity to the second proof mass anchor 403 and symmetric layout of the differential z-axis electrodes 415, 416 can allow for effects of package stress to cancel each other.

Figure 5A:
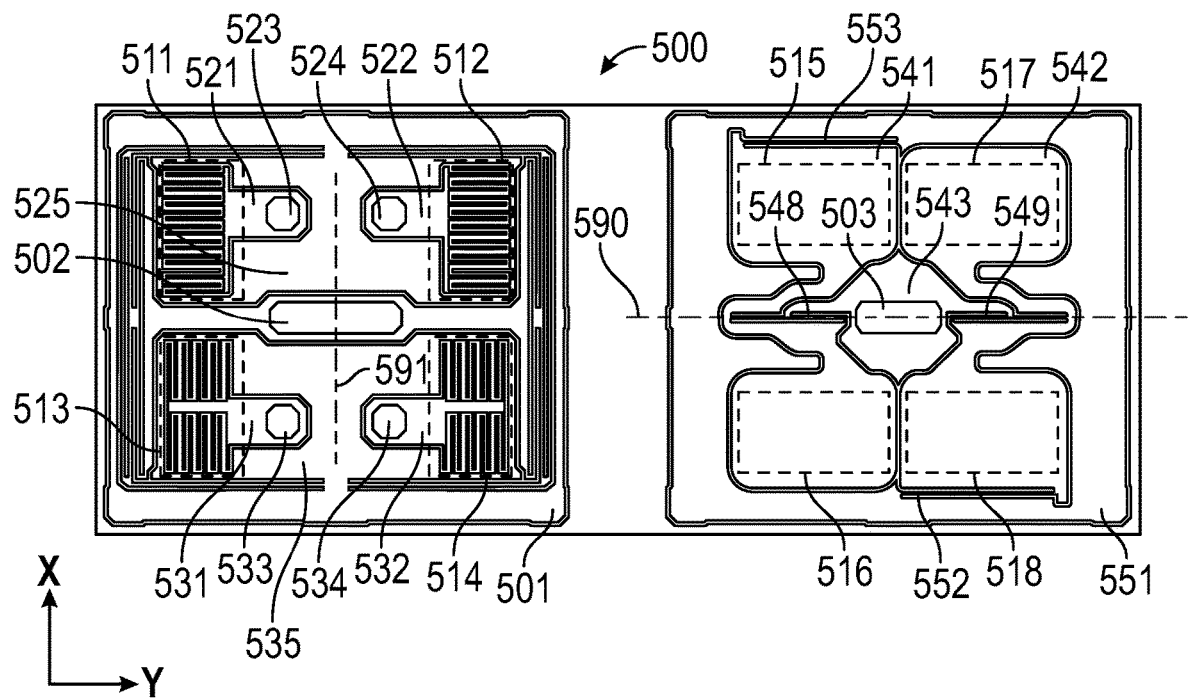
FIGS. 5A and 5B illustrate generally an example of a proof mass structure for an example MEMS accelerometer.
Figure 5B:
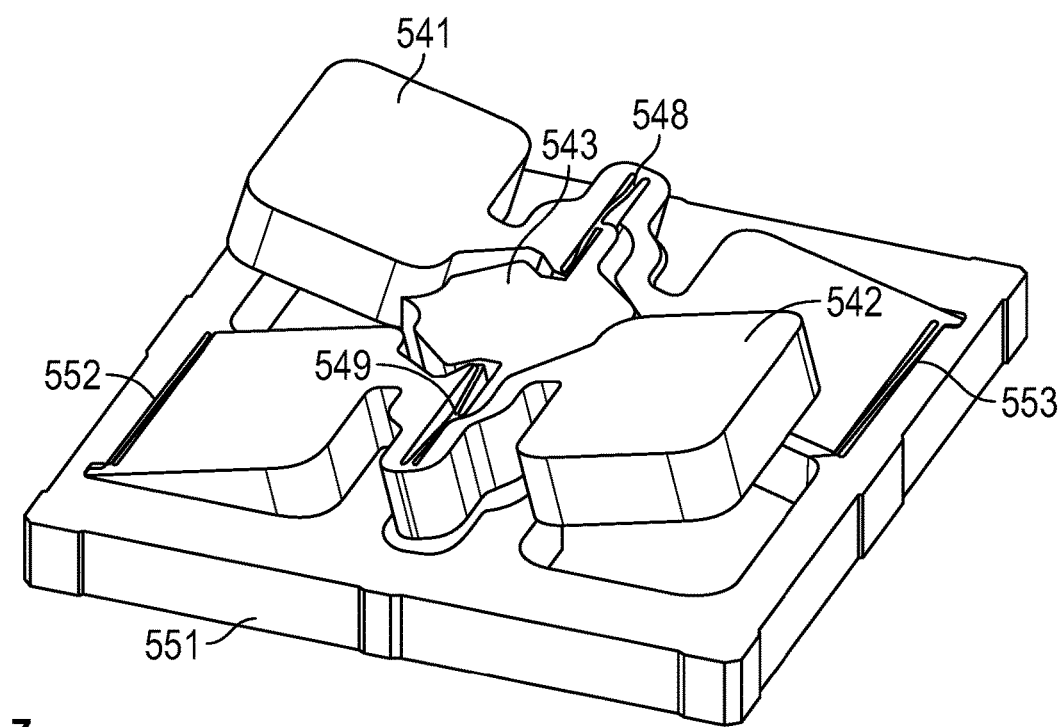

FIGS. 5A and 5B illustrate generally an example of a proof mass structure 500 for an example MEMS accelerometer. FIG. 5A illustrates a plan view of the proof mass structure 500 and FIG. 5B illustrates generally a perspective view of the proof mass structure 500 as the structure reacts to acceleration perpendicular to a plane defined by a major surface of the proof mass structure 500. The proof mass structure 500 can include a two proof masses 501, 551 for up to three axes, two elongated, central anchors 502, 503 for attaching the proof masses 501, 551 to a substrate (not shown) and for suspending the proof masses 501, 551 to allow for deflection, and differential electrodes 511-518 for one or more of the x, y and z axes.

FIG. 5A illustrates a plan view of the proof mass structure 500 in an example x-y reference plane. The example x-y reference plane corresponds to a plane parallel to the major surfaces of the proof mass structure 500. The proof mass can include moveable portions of up to 8 electrodes, 2 electrodes for each of the x and y axes and 4 electrodes for the z-axis.

X-axis electrodes 511, 512 can each include a stationary portion 521, 522 attached to and suspended from the substrate by an electrode anchor 523, 524, and a moveable portion 525 forming a part of the first proof mass 501. The shape of the two portions 521, 522, 525 of each electrode 511, 512 include corresponding comb-like structures that interleave. In certain examples, while the proof mass structure 500 is at rest, for each electrode 511, 512 of the x-axis differential electrode pair, a tooth of the moveable portion 525 is positioned between two teeth of the stationary portion 521, 522, 525 and vice-versa. In some examples, a tooth of one portion can be located closer to one of the two corresponding interleaved teeth of the other portion while the proof mass structure 500 is at rest. For differential electrodes, the tooth may be closer to a tooth in the positive x-direction for one electrode and a corresponding tooth can be closer to a tooth in the negative x-direction for the other electrode. When the first proof mass 501 accelerates along the x-axis, the moveable portion 525 can deflect in-plane, or parallel to the example x-y plane, and can change the distance between teeth of the interleaved electrode structures. The change in distance between teeth of the interleaved electrode structures can provide an electrical signal, single-ended from a single electrode or differential from a pair of electrodes, that indicates a magnitude of the acceleration in the x-direction. In certain examples, the two x-axis electrodes 511, 512 are arranged symmetrically about a line 591 that passes between the two x-axis electrodes 511, 512 and width-wise bisects a first, elongated central anchor 502.

Y-axis electrodes 513, 514 can each include a stationary portion 531, 532 attached to and suspended from the substrate by an electrode anchor 533, 534, and a moveable portion 535 forming a part of the first proof mass 501. The shape of the two portions 531, 532, 535 of each y-axis electrode 513, 514 include corresponding comb-like structures that interleave. In certain examples, while the proof mass structure 500 is at rest, for each y-axis electrode 513, 514 of the differential electrode pair, a tooth of the moveable portion 535 is positioned between two teeth of the stationary portion 531, 532 and vice-versa. In some examples, a tooth of one portion can be located closer to one of the two corresponding interleaved teeth of the other portion while the proof mass structure 500 is at rest. For differential electrodes, the tooth may be closer to a tooth in the positive y-direction for one electrode and a corresponding tooth can be closer to a tooth in the negative y-direction for the other electrode. When the first proof mass 501 accelerates along the y-axis, the moveable portion 535 can deflect in-plane, or parallel to the example x-y plane, and can change the distance between teeth of the interleaved electrode structures. The change in distance between teeth of the interleaved electrode structures can provide an electrical signal, single-ended from a single electrode or differential from a pair of electrodes, that indicates a magnitude of the acceleration in the y-direction. In certain examples, the two y-axis electrodes 513, 514 are arranged symmetrically about the line 591 that passes between the two y-axis electrodes 513, 514 and width-wise bisects the first elongated central anchor 502.

Z-axis electrodes 515, 516, 517, 518 can each include a stationary portion (not shown) attached to or integrated with the substrate, and a moveable portion 541, 542 forming a part of the second proof mass 551. In certain examples, the stationary portion of each z-axis electrode 515-518 forms a first capacitor plate and the moveable portion 541, 542 of each z-axis electrode forms a second corresponding capacitor plate. As illustrated in FIG. 2B, the moveable portions of the z-axis electrodes 515-518 can include two sub-portions 541, 542 that can rotate about a suspensions 548, 549 or connections coupling each sub-portion 541, 542 to a central z-axis portion 543. The central z-axis portion 543 can be directly coupled to a second central anchor 503 of the two central anchors 502, 503. In certain examples, the sub-portions 541, 542 of the second proof mass 551 can be asymmetrical along a line 590 length-wise bisecting the second central anchor 503 to allow for the deflection. Such asymmetry can provide each z-axis sub-portion 541, 542 with a high inertia moment area. The high inertia moment area can provide a mass that is located at a large radius from the suspensions 548, 549 that couple the corresponding sub-portion 548, 549 to the central z-axis portion 543. The asymmetric mass located at a large radius from the suspensions 548, 549 can provide a relatively large inertial torque in response to an acceleration along the z-axis. In certain examples, each z-axis sub portion 541, 542 can be associated with two electrodes such that the accelerometer includes 4 z-axis electrodes 515-518 or two pairs of differential z-axis electrodes 515, 516 and 517, 518. In certain examples, the z-axis electrodes 515-518 can be symmetrical to the line 590 and can be located close to the second central anchor 503. In some examples, the layout of the z-axis electrodes 515-518 can have diagonal symmetry or 180° rotational symmetry about the second central anchor 503. Such a symmetric and close relationship to the second central anchor 503 can assist in cancelling effects of package stress of the proof mass structure 500 because anomalies associated with package stress can often be distributed evenly with respect to the second central anchor 503, thus, the close proximity to the second central anchor 503 and symmetric layout of the differential z-axis electrodes 515-518 can allow for effects of package stress to cancel each other.

Figure 6A:
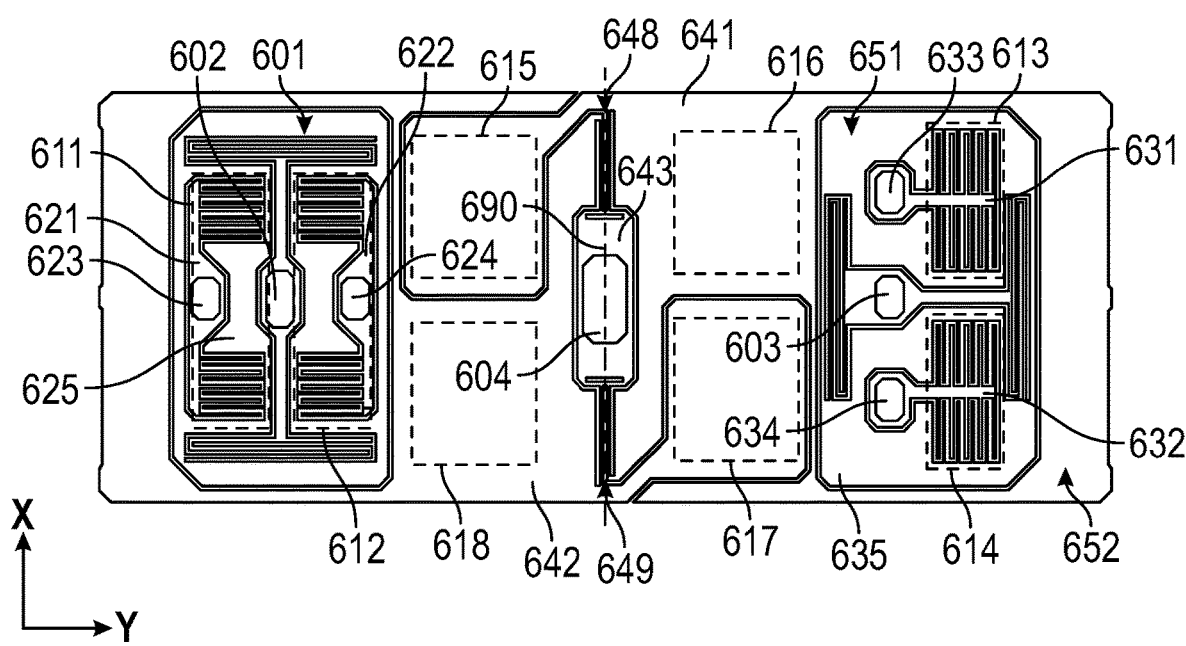
FIGS. 6A and 6B illustrate generally an example of a proof mass structure for an example MEMS accelerometer.
Figure 6B:
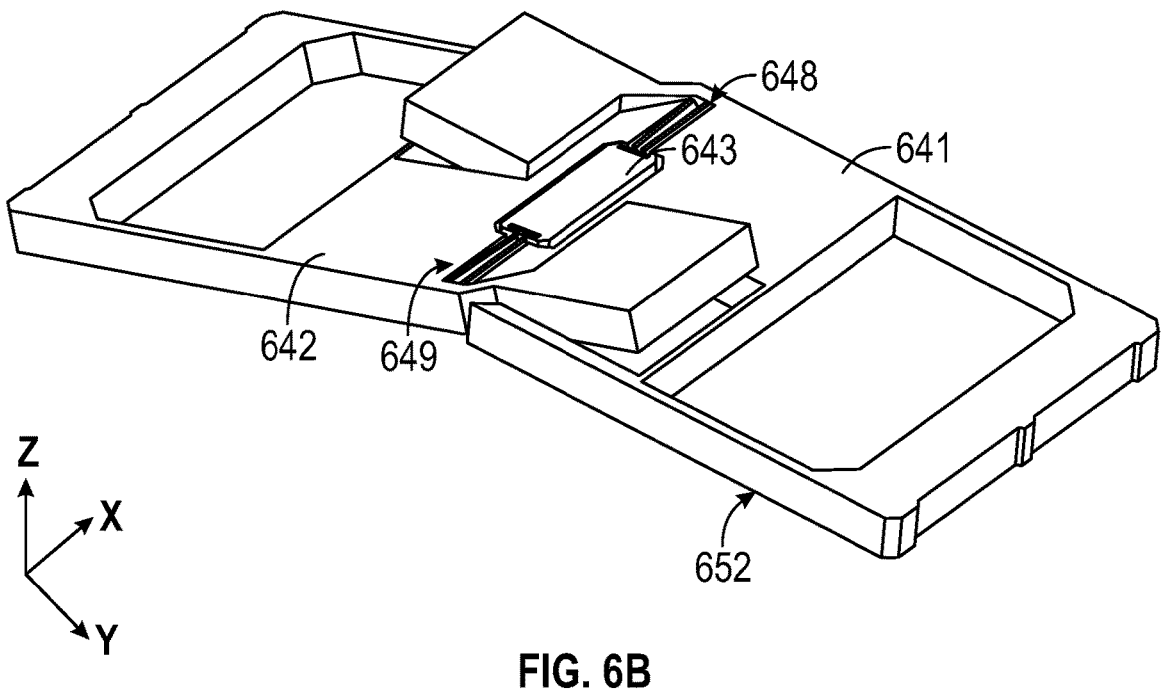

FIGS. 6A and 6B illustrate generally an example of a proof mass structure 600 for an example MEMS accelerometer. FIG. 6A illustrates a plan view of the proof mass structure 600 and FIG. 6B illustrates generally a perspective view of the a moveable z-axis proof mass 652 of the proof mass structure 600 as the structure reacts to acceleration perpendicular to a plane defined by a major surface of the proof mass structure 600. The proof mass structure 600 can include a three proof masses 601, 651, 652 for up to three axes, three elongated, proof mass anchors 602, 603, 604 for attaching the proof masses 601, 651, 652 to a substrate (not shown) and for suspending the proof masses 601, 651, 652 to allow for deflection, and differential electrodes 611-618 for one or more of the axes.

FIG. 6A illustrates a plan view of the proof mass structure 600 in an example x-y reference plane. The example x-y reference plane corresponds to a plane parallel to the major surfaces of the proof mass structure 600. The proof mass can include moveable portions of up to 8 electrodes, 2 electrodes for each of the x and y axes and 4 electrodes for the z-axis.

X-axis electrodes 611, 612 can each include a stationary portion 621, 622 attached to and suspended from the substrate by a pair of first electrode anchors 623, 624, and a moveable portion 625 forming a part of a first proof mass 601 suspended from the substrate by a first proof mass anchor 602. The shape of the two portions 621, 622, 625 of each electrode include corresponding comb-like structures that interleave. In certain examples, while the proof mass structure 600 is at rest, for each x-axis electrode 611, 612 of the differential x-axis electrode pair, a tooth of the moveable portion 625 is positioned between two teeth of the stationary portion 621, 622 and vice-versa. In some examples, a tooth of one portion can be located closer to one of the two corresponding interleaved teeth of the other portion while the proof mass structure is at rest. For differential electrodes, the tooth may be closer to a tooth in the positive x-direction for one electrode and a corresponding tooth can be closer to a tooth in the negative x-direction for the other electrode. When the first proof mass 601 accelerates along the x-axis, the moveable portion 625 can deflect in-plane, or parallel to the example x-y plane, and can change the distance between teeth of the interleaved electrode structures. The change in distance between teeth of the interleaved electrode structures can provide an electrical signal, single-ended from a single electrode or differential from a pair of electrodes, that indicates a magnitude of the acceleration in the x-direction. In certain examples, the two x-axis electrodes 611, 612 are arranged symmetrically about a line that passes between the two x-axis electrodes 611, 612 and length-wise bisects the first proof mass anchor 602.

Y-axis electrodes 613, 614 can each include a stationary portion 631, 632 attached to and suspended from the substrate by a second pair of electrode anchors 633, 634, and a moveable portion 635 forming a part of a second proof mass 651 suspended from the substrate by a second proof mass anchor 603. The shape of the two portions of each y-axis electrode 613, 614 include corresponding comb-like structures that interleave. In certain examples, while the proof mass structure 600 is at rest, for each y-axis electrode 613, 614 of the differential y-axis electrode pair, a tooth of the moveable portion 635 is positioned between two teeth of the stationary portion 631, 632 and vice-versa. In some examples, a tooth of one portion can be located closer to one of the two corresponding interleaved teeth of the other portion while the proof mass structure 600 is at rest. For differential electrodes, the tooth may be closer to a tooth in the positive y-direction for one electrode and a corresponding tooth can be closer to a tooth in the negative y-direction for the other electrode. When the proof mass 651 accelerates along the y-axis, the moveable portion 635 can deflect in-plane, or parallel to the example x-y plane, and can change the distance between teeth of the interleaved electrode structures. The change in distance between teeth of the interleaved electrode structures can provide an electrical signal, single-ended from a single electrode or differential from a pair of electrodes, that indicates a magnitude of the acceleration in the y-direction. In certain examples, the two y-axis electrodes 613, 614 are arranged symmetrically about a line that passes between the two y-axis electrodes 613, 614 and length-wise bisects the elongated second proof mass anchor 603.

Z-axis electrodes 615, 616, 617, 618 can each include a stationary portion attached to or integrated with the substrate, and a moveable portion 641, 642 forming a part of a third proof mass 652. In certain examples, the stationary portion of each z-axis electrode forms a first capacitor plate and the moveable portion 641, 642 of each z-axis electrode forms a second corresponding capacitor plate. As illustrated in FIG. 6B, the third proof-mass can include two sub-portions 641, 642 that can rotate about a suspension or connection 648, 649 coupling each portion 641, 642 to a central z-axis portion 643. The central z-axis portion 643 can be directly coupled to a third proof mass anchor 604. In certain examples, moveable portions 641, 642 of the third proof mass 652 can be asymmetrical along a line 690 length-wise bisecting the third proof mass anchor 604 to allow for the deflection. Such asymmetry can provide each sub-portion 641, 642 with a high inertia moment area. The high inertia moment area can provide a mass that is located at a large radius from the suspensions 648, 649 that couple the sub-portion 641, 642 to the central z-axis portion 643. The asymmetric mass located at a large radius from the suspensions 648, 649 can provide a relatively large inertial torque in response to an acceleration along the z-axis. In certain examples, each z-axis sub portion 641, 642 can be associated with two electrodes 615-616, 617, 618 such that the accelerometer includes 4 z-axis electrodes 615, 616, 617, 618 or two pairs of differential z-axis electrodes 615-616, 617-618. In certain examples, the z-axis electrodes 615-618 can be symmetrical to the line 390 and can be located close to the z-axis anchor, or third proof mass anchor 604. In some examples, the layout of the z-axis electrodes 615-618 can have diagonal symmetry or 180° rotational symmetry about the z-axis anchor 604. Such a symmetric and close relationship to the z-axis anchor 604 can assist in cancelling effects of package stress of the proof mass structure because anomalies associated with package stress can often be distributed evenly with respect to the z-axis anchor 604. Thus, the close proximity to the z-axis anchor 604 and symmetric layout of the differential z-axis electrodes 615-618 can allow for effects of package stress to cancel each other.

ADDITIONAL NOTES AND EXAMPLES

In Example 1, a MEMS accelerometer can include a first proof mass anchor, a first proof mass suspended from a substrate by the first proof mass anchor, the first proof mass having a major surface defining a first plane, a first portion of a first electrode, the first portion of the first electrode configured to electrically interact with a second portion of the first electrode, wherein the first proof mass includes the second portion of the first electrode, a first portion of a second electrode, the first portion of the second electrode configured to electrically interact with a second portion of the second electrode, wherein the first proof mass includes the second portion of the second electrode, wherein the first electrode and the second electrode are configured to provide a differential signal representative of acceleration of the accelerometer along an axis perpendicular to the first plane, wherein the first portion of the first electrode and the first portion of the second electrode are symmetric with each other across a first line, and wherein the first line bisects the first proof mass anchor, extends parallel to the first plane and extends between the first electrode and the second electrode.

In Example 2, the accelerometer of Example 1 optionally includes a third electrode having first portion and a second portion, wherein the first portion of the third electrode is suspended from the substrate by a first electrode anchor, wherein the first proof mass includes the second portion of the third electrode, and wherein the second portion of the third electrode is configured to deflect parallel to the first plane in response to acceleration along a first axis parallel to the first plane.

In Example 3, the accelerometer of any one or more of Examples 1-2 optionally includes a fourth electrode having first portion and a second portion, wherein the first portion of the fourth electrode is suspended from the substrate by a second electrode anchor, wherein the proof mass includes the second portion of the fourth electrode, and wherein the second portion of the fourth electrode is configured to deflect parallel to the first plane in response to acceleration along the first axis parallel to the first plane.

In Example 4, the third electrode and the fourth electrode of any one or more of Examples 1-3 optionally are configured to provide a differential signal representative of the acceleration along the first axis.

In Example 5, the accelerometer of any one or more of Examples 1-4 optionally includes a second proof mass anchor, a second proof mass suspended from the substrate by the second proof mass anchor, the second proof mass having a major surface defining the first plane, a first portion of a fifth electrode, the first portion of the fifth electrode configured to electrically interact with a second portion of the fifth electrode, wherein the second proof mass includes the second portion of the fifth electrode a first portion of a sixth electrode, the first portion of the sixth electrode configured to electrically interact with a second portion of the sixth electrode, wherein the second proof mass includes the second portion of the sixth electrode, wherein the fifth electrode and the sixth electrode are configured to provide a differential signal representative of acceleration of the accelerometer along an axis perpendicular to the first plane, and wherein the first portion of the fifth electrode and the first portion of the sixth electrode are symmetric with each other across the first line.

In Example 6, the first line of any one or more of Examples 1-5 optionally bisects the second proof mass anchor, extends parallel to the first plane and extends between the fifth electrode and the sixth electrode.

In Example 7, the accelerometer of any one or more of Examples 1-6 optionally includes a seventh electrode having first portion and a second portion, wherein the first portion of the seventh electrode is suspended from the substrate by a third electrode anchor, wherein the second proof mass includes the second portion of the seventh electrode, wherein the second portion of the seventh electrode is configured to deflect parallel to the first plane in response to acceleration along a second axis parallel to the first plane, and wherein the second axis is perpendicular to the first axis.

In Example 8, the accelerometer of any one or more of Examples 1-7 optionally includes an eighth electrode having first portion and a second portion, wherein the first portion of the eighth electrode is suspended from the substrate by a fourth electrode anchor, wherein the second proof mass includes the second portion of the eighth electrode, and wherein the second portion of the eighth electrode is configured to deflect parallel to the first plane in response to acceleration along the second axis.

In Example 9, the accelerometer of any one or more of Examples 1-8 optionally includes a first connection and a second connection configured to couple the second portions of both the first electrode and the second electrode with the first proof mass anchor and to allow the second portions of both the first electrode and the second electrode to rotate in response to acceleration along the axis perpendicular to the first plane.

In Example 10, the accelerometer of any one or more of Examples 1-9 optionally includes a third connection and a fourth connection configured to couple the second portions of both the fifth electrode and the sixth electrode with the second proof mass anchor and to allow the second portions of both the fifth electrode and the sixth electrode to rotate in response to acceleration along the axis perpendicular to the first plane.

In Example 11, the accelerometer of any one or more of Examples 1-10 optionally includes a first connection and a second connection configured to couple the second portions of both the first electrode and the second electrode with the first proof mass anchor and to allow the second portions of both the first electrode and the second electrode to rotate in response to acceleration along the axis perpendicular to the first plane.

In Example 12, the accelerometer of any one or more of Examples 1-11 optionally includes a fifth electrode having a first portion and a second portion, wherein the first portion of the fifth electrode is suspended from the substrate by a third electrode anchor, wherein the first proof mass includes the second portion of the fifth electrode, wherein the second portion of the fifth electrode is configured to deflect parallel to the first plane in response to acceleration along a second axis parallel to the first plane, and wherein the second axis is perpendicular to the first axis.

In Example 13, the accelerometer of any one or more of Examples 1-12 optionally includes a sixth electrode having a first portion and a second portion, wherein the first portion of the sixth electrode is suspended from the substrate by a fourth electrode anchor, wherein the first proof mass includes the second portion of the sixth electrode, and wherein the second portion of the sixth electrode is configured to deflect parallel to the first plane in response to acceleration along the second axis parallel to the first plane.

In Example 14, the fifth electrode and the sixth electrode of any one or more of Examples 1-13 optionally are configured to provide a differential signal representative of the acceleration along the second axis.

In Example 15, the accelerometer of any one or more of Examples 1-14 optionally includes a first portion of a third electrode, the first portion of the third electrode configured to electrically interact with a second portion of the third electrode, wherein the first proof mass includes the second portion of the third electrode, a first portion of a fourth electrode, the first portion of the fourth electrode configured to electrically interact with a second portion of the fourth electrode, wherein the first proof mass includes the second portion of the fourth electrode, wherein the third electrode and the fourth electrode are configured to provide a differential signal representative of acceleration of the accelerometer along the axis perpendicular to the first plane, and wherein the first electrode and the second electrode are symmetric with each other across a first line.

In Example 16, the accelerometer of any one or more of Examples 1-15 optionally includes a central proof mass portion of the first proof mass directly coupled to the first proof mass anchor, and a first connection coupling the second portion of the first electrode and second portion of the second electrode to the central proof mass portion, the first connection configured to allow the second portion of the first electrode and second portion of the second electrode to rotate in response to acceleration along the axis perpendicular to the first plane.

In Example 17, the accelerometer of any one or more of Examples 1-16 optionally includes a second connection coupling the second portion of the third electrode and the second portion of the fourth electrode to the central proof mass portion, the second connection configured to allow the second portion of the third electrode and second portion of the fourth electrode to rotate in response to acceleration along the axis perpendicular to the first plane.

In Example 18, under a given acceleration along the axis perpendicular to the first plane, the second portion of the first electrode and second portion of the second electrode of any one or more of Examples 1-17 optionally are configured to rotate in a opposite direction than the second portion of the third electrode and the second portion of the fourth electrode.

In Example 19, the accelerometer of any one or more of Examples 1-18 optionally includes a fifth electrode having a first portion and a second portion, wherein the first portion of the fifth electrode is suspended from the substrate by a first electrode anchor, wherein the first proof mass includes the second portion of the fifth electrode, and wherein the second portion of the fifth electrode is configured to deflect parallel to the first plane in response to acceleration along a first axis parallel to the first plane.

In Example 20, the accelerometer of any one or more of Examples 1-19 optionally includes a second proof mass anchor configured to suspend the second portion of the fifth electrode from the substrate, and wherein the first proof mass includes a frame configured to couple the second portion of the fifth electrode with the second portions of the first, second, third and fourth electrodes.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A MEMS accelerometer comprising:
a proof mass structure having a major surface defining a x-y reference plane, the proof mass structure including a first proof mass and a second proof mass, and
a first proof mass anchor,
the first proof mass suspended from a substrate by the first proof mass anchor;
a first portion of a first z-axis electrode, the first portion of the first z-axis electrode configured to electrically interact with a second portion of the first z-axis electrode, wherein the first proof mass includes the second portion of the first z-axis electrode;
a first portion of a second z-axis electrode, the first portion of the second electrode configured to electrically interact with a second portion of the second z-axis electrode, wherein the first proof mass includes the second portion of the second z-axis electrode;
wherein the first z-axis electrode and the second z-axis electrode are configured to provide a differential signal representative of acceleration of the accelerometer along an axis perpendicular to the x-y reference;
a second proof mass anchor,
the second proof mass suspended from the substrate by the second proof mass anchor, the second proof mass including one or more electrodes sensing deflections along one or more axes in the x-y reference plane;
wherein the one or more electrodes sensing deflections along one or more axes in the x-y reference plane include a first electrode, a second electrode and a third electrode, each electrode having a first portion and a second portion, wherein the first portion of each electrode is suspended from the substrate by a respective electrode anchor, and the second proof mass includes the second portion of each electrode,
wherein the second portions of the first electrode and the second electrode are configured to deflect parallel to the x-y reference plane in response to acceleration along a first axis parallel to the x-y reference plane, wherein the second portion of the third electrode is configured to deflect parallel to the x-y reference plane in response to acceleration along a second axis parallel to the x-y reference plane, and
wherein the second axis is perpendicular to the first axis.

2. The accelerometer of claim 1, wherein the first electrode and the second electrode are configured to provide a differential signal representative of the acceleration along the first axis.

3. The accelerometer of claim 1, further comprising:
a third z-axis electrode and a fourth z-axis electrode,
a first portion of the third z-axis electrode configured to electrically interact with a second portion of the third z-axis electrode, a first portion of the fourth z-axis electrode configured to electrically interact with a second portion of the fourth z-axis electrode,
wherein the first proof mass includes the second portion of the third z-axis electrode and the second portion of the fourth z-axis electrode;
wherein the third z-axis electrode and the fourth z-axis electrode are configured to provide a differential signal representative of acceleration of the accelerometer along an axis perpendicular to the x-y reference plane; and
wherein the first portion of the third z-axis electrode and the first portion of the fourth z-axis electrode are symmetric with each other across a first line.

4. The accelerometer of claim 3, wherein the first line bisects the first proof mass anchor, extends parallel to the x-y reference plane and extends between the third z-axis electrode and the fourth z-axis electrode.

5. The accelerometer of claim 1, further comprising: a fourth electrode having first portion and a second portion,
   wherein the first portion of the fourth electrode is suspended from the substrate by a fourth electrode anchor;
   wherein the second proof mass includes the second portion of the fourth electrode; and
   wherein the second portion of the fourth electrode is configured to deflect parallel to the x-y reference plane in response to acceleration along the second axis.

6. The accelerometer of claim 3, further comprising: a first connection configured to couple the second portions of both the first z-axis electrode and the second z-axis electrode with the first proof mass anchor and to allow the second portions of both the first z-axis electrode and the second z-axis electrode to rotate in response to acceleration along the axis perpendicular to the x-y reference plane.

7. The accelerometer of claim 6, further comprising: a second connection configured to couple the second portions of both the third z-axis electrode and the fourth z-axis electrode with the first proof mass anchor and to allow the second portions of both the third z-axis electrode and the fourth z-axis electrode to rotate in response to acceleration along the axis perpendicular to the x-y reference plane.

8. The accelerometer of claim 1, further comprising:
   a first connection and a second connection configured to couple the portions of both the first z-axis electrode and the second z-axis electrode with the first proof mass anchor and to allow the second portions of both the first z-axis electrode and the second z-axis electrode to rotate in response to acceleration along the axis perpendicular to the x-y reference plane.

9. The accelerometer of claim 8, wherein the one or more electrodes sensing deflections along one or more axes in the x-y reference plane include a fourth electrode having a first portion and a second portion;
   wherein the first portion of the fourth electrode is suspended from the substrate by a fourth electrode anchor;
   wherein the second proof mass includes the second portion of the fourth electrode; and
   wherein the second portion of the fourth electrode is configured to deflect parallel to the x-y reference plane in response to acceleration along the second axis parallel to the x-y reference plane.

10. The accelerometer of claim 9, wherein the third electrode and the fourth electrode are configured to provide a differential signal representative of the acceleration along the second axis.

11. The accelerometer of claim 1, further comprising:
   a first portion of a third z-axis electrode, the first portion of the third z-axis electrode configured to electrically interact with a second portion of the third z-axis electrode,
   wherein the first proof mass includes the second portion of the third z-axis electrode; a first portion of a fourth z-axis electrode, the first portion of the fourth z-axis electrode configured to electrically interact with a second portion of the fourth z-axis electrode, wherein the first proof mass includes the second portion of the fourth z-axis electrode;
   wherein the third z-axis electrode and the fourth z-axis electrode are configured to provide a differential signal representative of acceleration of the accelerometer along the axis perpendicular to the x-y reference plane; and
   wherein the first z-axis electrode and the second z-axis electrode are symmetric with each other across a first line.

12. The accelerometer of claim 11, further comprising:
   a central proof mass portion of the first proof mass directly coupled to the first proof mass anchor; and
   a first connection coupling the portion of the first z-axis electrode and the second portion of the second z-axis electrode to the central proof mass portion, the first connection configured to allow the second portion of the first z-axis electrode and second portion of the second z-axis electrode to rotate in response to acceleration along the axis perpendicular to the x-y reference plane.

13. The accelerometer of claim 12, further comprising:
   a second connection coupling the second portion of the third z-axis electrode and the second portion of the fourth z-axis electrode to the central proof mass portion, the second connection configured to allow the second portion of the third z-axis electrode and second portion of the fourth z-axis electrode to rotate in response to acceleration along the axis perpendicular to the x-y reference plane.

14. The accelerometer of claim 13, wherein a given acceleration along the axis perpendicular to the x-y reference plane, the second portions of the first z-axis electrode and second portion of the second z-axis electrode are configured to rotate in a opposite direction than the second portion of the third z-axis electrode and the second portion of the fourth z-axis electrode.

* * * * *